(12) United States Patent
Ernst et al.

(10) Patent No.: US 8,120,832 B2
(45) Date of Patent: Feb. 21, 2012

(54) HIGH SPEED ELECTROMECHANICAL SHUTTER

(75) Inventors: Charles Henry Ernst, Colorado Springs, CO (US); James Joseph Wade, Boulder, CO (US); Craig Cambier, Louisville, CO (US); Keith W. Malang, Longmont, CO (US)

(73) Assignee: Inphase Technologies, Inc., Longmont, CO (US)

( * ) Notice: Subject to any disclaimer, the term of this patent is extended or adjusted under 35 U.S.C. 154(b) by 1217 days.

(21) Appl. No.: 11/752,804

(22) Filed: May 23, 2007

(65) Prior Publication Data
US 2007/0286056 A1 Dec. 13, 2007

Related U.S. Application Data

(60) Provisional application No. 60/802,530, filed on May 23, 2006.

(51) Int. Cl.
G02B 26/02 (2006.01)
(52) U.S. Cl. .......................... 359/230; 359/900; 396/464
(58) Field of Classification Search .......... 359/227–236; 396/452, 457, 463–464, 469–470, 493–501
See application file for complete search history.

(56) References Cited

U.S. PATENT DOCUMENTS

| | | | |
|---|---|---|---|
| 3,595,553 A | 7/1971 | Vicent | |
| 3,664,251 A | 5/1972 | Vicent | |
| 4,408,857 A * | 10/1983 | Frank | 396/449 |
| 4,671,638 A | 6/1987 | Capoblanco et al. | |
| 4,724,452 A * | 2/1988 | Mody et al. | 396/464 |
| 5,058,124 A | 10/1991 | Cameron et al. | |
| 5,164,936 A | 11/1992 | Kagami | |
| 5,228,017 A | 7/1993 | Matsuzaki et al. | |
| 5,428,589 A | 6/1995 | Shtipelman | |
| 5,446,721 A | 8/1995 | Sekimoto et al. | |
| 5,502,524 A | 3/1996 | Bovenzi et al. | |
| 5,508,772 A | 4/1996 | Tanabe | |
| 5,517,267 A | 5/1996 | Tanabe | |
| 5,602,808 A | 2/1997 | Futagawa et al. | |
| 5,748,580 A | 5/1998 | Matsui | |
| 6,047,008 A | 4/2000 | Funakawa | |
| 6,103,454 A | 8/2000 | Dhar et al. | |
| 6,285,644 B1 | 9/2001 | Kano | |
| 6,414,763 B1 | 7/2002 | Hesselink et al. | |
| 6,449,627 B1 | 9/2002 | Baer et al. | |

(Continued)

OTHER PUBLICATIONS

Psaltis et al., "Holographic Memories," *Scientific American*, Nov. 1995.

(Continued)

*Primary Examiner* — James Phan
(74) *Attorney, Agent, or Firm* — Vedder Price P.C.; Ajay A. Jagtiani

(57) ABSTRACT

An electromechanical shutter device comprising a base member and a shutter assembly comprising: an electrical current source member; a shutter member movable between a light beam blocked position and a light beam passed position; a light beam blocking member associated with the shutter member; a shutter coil associated with the shutter member which generates an electromagnetic force when energized; at least one magnet which generates a magnet flux directed towards and intersecting the shutter coil; electrically conductive means connecting the electrical current source member to the shutter member for passing electrical current to energize the shutter coil and to control movement of the shutter member between the light beam blocked and passed positions; wherein when the shutter coil is energized, an electromagnetic force is generated that interacts with the magnetic flux to thereby cause movement of the shutter member between the light beam blocked and light beam passed positions.

26 Claims, 10 Drawing Sheets

U.S. PATENT DOCUMENTS

| | | |
|---|---|---|
| 6,482,551 B1 | 11/2002 | Dhar et al. |
| 6,614,566 B1 | 9/2003 | Curtis et al. |
| 6,650,447 B2 | 11/2003 | Curtis et al. |
| 6,743,552 B2 | 6/2004 | Setthachayanon et al. |
| 6,765,061 B2 | 7/2004 | Dhar et al. |
| 6,780,546 B2 | 8/2004 | Trentler et al. |
| 6,937,331 B1 | 8/2005 | Nguyen |
| 6,987,435 B2 | 1/2006 | Ko et al. |
| 7,038,977 B2 | 5/2006 | Cheong et al. |
| 7,092,133 B2 | 8/2006 | Anderson et al. |
| 2003/0206320 A1 | 11/2003 | Cole et al. |
| 2004/0027625 A1 | 2/2004 | Trentler et al. |
| 2006/0291023 A1 | 12/2006 | Riley et al. |

OTHER PUBLICATIONS

McLeod et al. "Micro-Holographic Multi-Layer Optical Disk Data Storage," *International Symposium on Optical Memory and Optical Data Storage* (Jul. 2005).

PCT/US2007/06094 International Search Report and the Written Opinion of the International Searching Authority, or the Declaration, mailed Aug. 22, 2008.

PCT/US2006/19906 International Search Report and the Written Opinion of the International Searching Authority, or the Declaration, mailed Sep. 16, 2008.

* cited by examiner

HIGH SPEED ELECTROMECHANICAL SHUTTER

CROSS-REFERENCE TO RELATED APPLICATIONS

This application makes reference to and claims the priority date of U.S. Provisional Patent Application No. 60/802,530, entitled "High-Speed, Electromechanical Shutter" filed May 23, 2006. The entire disclosure and contents of the above application is hereby incorporated herein by reference.

BACKGROUND

1. Field of the Invention

The present invention broadly relates to an electromechanical shutter device for blocking and passing a light beam with a movable shutter member by using electromagnetic, instead of mechanical, forces. The present invention also broadly relates to a system which uses a shutter state machine to electronically control the movement of the shutter member between positions for blocking or passing the light beam. The present invention further broadly relates to a method for electronically controlling the movement of the shutter member to block or pass the light beam.

2. Related Art

Developers of information storage devices and methods continue to seek increased storage capacity. As part of this development, holographic memory systems have been suggested as alternatives to conventional memory devices. Holographic memory systems may be designed to record data as one bit of information (i.e., bit-wise data storage). See McLeod et al. "Micro-Holographic Multi-Layer Optical Disk Data Storage," *International Symposium on Optical Memory and Optical Data Storage* (July 2005). Holographic memory systems may also be designed to record an array of data that may be a 1-dimensional linear array (i.e., a 1×N array, where N is the number linear data bits), or a 2-dimensional array commonly referred to as a "page-wise" memory system. Page-wise memory systems may involve the storage and readout of an entire two-dimensional representation, e.g., a page of data. Typically, recording light passes through a two-dimensional array of low and high transparency areas representing data, and the system stores, in three dimensions, the pages of data holographically as patterns of varying refractive index imprinted into a storage medium. See Psaltis et al., "Holographic Memories," *Scientific American*, November 1995, where holographic systems are discussed generally, including page-wise memory systems.

Holographic data storage systems may perform a data write (also referred to as a data record or data store operation, simply "write" operation herein) by combining two coherent light beams, such as laser beams, at a particular point within the storage medium. Specifically, a data-encoded light beam may be combined with a reference light beam to create an interference pattern in the holographic storage medium. The pattern created by the interference of the data beam and the reference beam forms a hologram which may then be recorded in the holographic medium. If the data-bearing beam is encoded by passing the data beam through, for example, a spatial light modulator (SLM), the hologram(s) may be recorded in the holographic medium.

Holographically-stored data may then be retrieved from the holographic data storage system by performing a read (or reconstruction) of the stored data. The read operation may be performed by projecting a reconstruction or probe beam into the storage medium at the same angle, wavelength, phase, position, etc., as the reference beam used to record the data, or compensated equivalents thereof. The hologram and the reference beam interact to reconstruct the data beam.

To mechanically block or switch a beam, the shutter which blocks/switches the beam needs to be moved across the beam diameter. This shutter needs to accelerate, traverse the beam, and then decelerate to a stop on the opposite side of the beam. To minimize the movement time, the acceleration needs to be maximized. This means a high force may need to be applied to a low mass. This provides a high acceleration and low power consumption if the actuation can be accomplished with a highly efficient actuator design. Present designs block the entire beam, using, for example, heavy metal shutters and inefficient motor designs. See, for example, U.S. Pat. No. 3,664,251 (Vicent), issued May 23, 1972; U.S. Pat. No. 5,502,524 (Bovenzi et al.), issued Mar. 26, 1996; and U.S. Pat. No. 5,517,267 (Tanabe), issued May 14, 1996. This leads to slower times and higher power consumption, which limits the performance and lifetime of these shutters.

SUMMARY

According to a first broad aspect of the present invention, there is provided a device comprising a electromechanical shutter device comprising a base member and a shutter assembly associated with the base member, the shutter assembly comprising:
- an electrical current source member associated with the base member;
- a shutter member spaced apart from and movable with respect to the electrical current source member between a light beam blocked position and a light beam passed position;
- a light beam blocking member associated with the shutter member for blocking a light beam when the shutter member is moved to the light beam blocked position and for not blocking the light beam when the shutter member is moved to the light beam passed position;
- a shutter coil associated with the shutter member which generates an electromagnetic force when energized;
- at least one magnet positioned proximate to the shutter coil and which generates a magnet flux directed towards and intersecting the shutter coil;
- electrically conductive means connecting the electrical current source member to the shutter member for passing electrical current from the electrical current source member to the shutter member to energize the shutter coil and to control movement of the shutter member between the light beam blocked position and the light beam passed position;
- wherein when the shutter coil is energized, an electromagnetic force is generated by the shutter coil which interacts with the magnetic flux to thereby cause movement of the shutter member between the light beam blocked position and the light beam passed position.

According to a second broad aspect of the invention, there is provided a system comprising a electromechanical shutter device comprising a base member and a shutter assembly associated with the base member, the shutter assembly comprising:
- an electrical current source member associated with the base member;
- a shutter member spaced apart from and movable with respect to the electrical current source member between a light beam blocked position and a light beam passed position;

a light beam blocking member associated with the shutter member for blocking a light beam when the shutter member is moved to the light beam blocked position and for not blocking the light beam when the shutter member is moved to the light beam passed position;

a shutter coil associated with the shutter member which generates an electromagnetic force when energized;

at least one magnet positioned proximate to the shutter coil and which generates a magnetic flux directed towards and intersecting the shutter coil;

electrically conductive means connecting the electrical current source member to the shutter member for passing electrical current from the electrical current source member to the shutter member to energize the shutter coil and to control movement of the shutter member between a light beam blocked position and a light beam passed position;

wherein when the shutter coil is energized, an electromagnetic force is generated by the shutter coil which interacts with the magnetic flux to thereby cause movement of the shutter member between the light beam blocked position and the light beam passed position; and a shutter state machine which electronically controls the movement of the shutter member between the light beam blocked position and the light beam passed position wherein the light beam blocking member: (1) blocks the light beam when the shutter member is in the light beam blocked position; or (2) does not block the light beam when the shutter member is in the light beam passed position.

According to a third broad aspect of the invention, there is provided a method comprising the following steps:

a. providing a light beam;

b. providing an electromechanical shutter device comprising a base member and a shutter assembly associated with the base member, the shutter assembly comprising:

an electrical current source member associated with the base member;

a shutter member spaced apart from and movable with respect to the electrical current source member between a light beam blocked position and a light beam passed position;

a light beam blocking member associated with the shutter member for blocking a light beam when the shutter member is moved to the light beam blocked position and for not blocking the light beam when the shutter member is moved to the light beam passed position;

a shutter coil associated with the shutter member which generates an electromagnetic force when energized;

at least one magnet positioned proximate to the shutter coil and which generates a magnetic flux directed towards and intersecting the shutter coil;

electrically conductive means connecting the electrical current source member to the shutter member for passing electrical current from the electrical current source member to the shutter member to energize the shutter coil and to control movement of the shutter member between the light beam blocked position and the light beam passed position;

wherein when the shutter coil is energized, an electromagnetic force is generated by the shutter coil which interacts with the magnetic flux to thereby cause movement of the shutter member between the light beam blocked position and light beam passed position; and c. electronically controlling movement of the shutter member between the light beam blocked position and the light beam passed position wherein the light beam blocking member: (1) blocks the light beam when the shutter member is in the light beam blocked position; or (2) does not block the light beam when the shutter member is in the light beam passed position.

According to a fourth broad aspect of the present invention, there is provided a device comprising a electromechanical shutter device comprising a base member and a shutter assembly associated with the base member, the shutter assembly comprising:

a stationary printed circuit board electrical current source anchor member associated with the base member;

a printed circuit board shutter member spaced apart from and movable with respect to the anchor member between a light beam blocked position and a light beam passed position;

a shutter associated with the shutter member for blocking a light beam when the shutter member is moved to the light beam blocked position and for not blocking the light beam when the shutter member is moved to the light beam passed position;

a shutter coil formed in the shutter member which generates an electromagnetic force when energized;

at least one magnet positioned proximate to the shutter coil and which generates a magnetic flux directed towards and intersecting the shutter coil;

a suspension spring assembly comprising electrically conductive suspension wires connecting the anchor member to the shutter member for passing electrical current from the anchor member to the shutter member to energize the shutter coil and to control movement of the shutter member between the light beam blocked position and the light beam passed position;

wherein when the shutter coil is energized, an electromagnetic force is generated by the shutter coil which interacts with the magnetic flux to thereby cause movement of the shutter member between the light beam blocked position and the light beam passed position.

BRIEF DESCRIPTION OF THE DRAWINGS

The invention will be described in conjunction with the accompanying drawings, in which.

DETAILED DESCRIPTION

Figure 1:
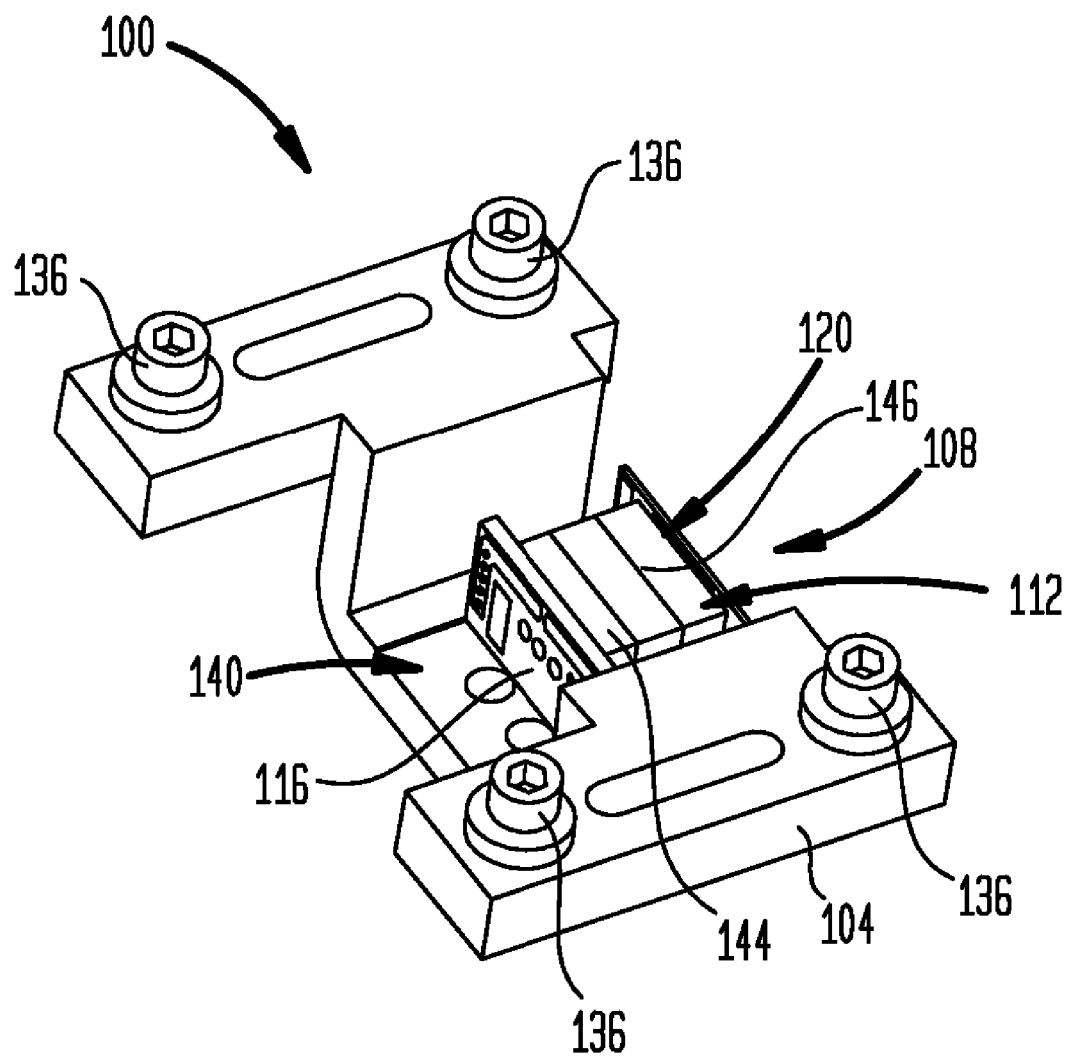
FIG. 1 is a perspective view of an embodiment of a electromechanical shutter device of the present invention.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "top", "bottom", "above", "below", "left", "right", "horizontal", "vertical", "upward", "downward", etc. are merely used for convenience in describing the various embodiments of the present invention. The embodiments of the present invention may be oriented in various ways. For example, the embodiments shown in FIGS. 1 through 9 may be flipped over, rotated by 90° in any direction, etc.

For the purposes of the present invention, the term "laser" refers to conventional lasers, as well as laser emitting diodes (LEDs).

For the purposes of the present invention, the term "light beam" refers to any source of electromagnetic radiation of any wavelength, for example, from a laser, etc. Suitable light beams for use in embodiments of the present invention include, but are not limited to, those obtained by conventional laser sources, e.g. the blue and green lines of $Ar^+$ (458, 488, 514 nm) and He—Cd lasers (442 nm), the green line of frequency doubled YAG lasers (532 nm), and the red lines of He—Ne (633 nm), $Kr^+$ lasers (647 and 676 nm), and various laser diodes (LDs) (e.g., emitting light having wavelengths of from 290 to 900 nm).

For the purposes of the present invention, the term "spatial light intensity" refers to a light intensity distribution or pattern of varying light intensity within a given volume of space.

For the purposes of the present invention, the terms "holographic grating," "holograph" or "hologram" (collectively and interchangeably referred to hereafter as "hologram") are used in the conventional sense of referring to an interference pattern formed when a signal beam and a reference beam interfere with each other. In cases wherein digital data is recorded, the signal beam may be encoded with a data modulator, e.g., a spatial light modulator, etc.

For the purposes of the present invention, the term "holographic recording" refers to the act of recording a hologram in a holographic storage medium.

For the purposes of the present invention, the term "holographic storage medium" refers to a component, material, etc., that is capable of recording and storing, in three dimensions (i.e., the X, Y and Z dimensions), one or more holograms as one or more pages as patterns of varying refractive index imprinted into the medium. Examples of holographic media useful herein include, but are not limited to, those described in: U.S. Pat. No. 6,103,454 (Dhar et al.), issued Aug. 15, 2000; U.S. Pat. No. 6,482,551 (Dhar et al.), issued Nov. 19, 2002; U.S. Pat. No. 6,650,447 (Curtis et al.), issued Nov. 18, 2003; U.S. Pat. No. 6,743,552 (Setthachayanon et al.), issued Jun. 1, 2004; U.S. Pat. No. 6,765,061 (Dhar et al.), Jul. 20, 2004; U.S. Pat. No. 6,780,546 (Trentler et al.), issued Aug. 24, 2004; U.S. Patent Application No. 2003-0206320 (Cole et al.), published Nov. 6, 2003, and U.S. Patent Application No. 2004-0027625 (Trentler et al.), published Feb. 12, 2004, the entire contents and disclosures of which are herein incorporated by reference.

For the purposes of the present invention, the term "data page" or "page" refers to the conventional meaning of data page as used with respect to holography. For example, a data page may be a page of data (i.e., two-dimensional assembly of data), one or more pictures, etc., to be recorded in a holographic storage medium.

For the purposes of the present invention, the term "recording light" refers to a light beam used to record into a holographic storage medium. The spatial light intensity pattern of the recording light is what is recorded.

For the purposes of the present invention, the term "recording data" refers to storing or writing holographic data in a holographic medium.

For the purposes of the present invention, the term "reading data" refers to retrieving, recovering, or reconstructing holographic data stored in a holographic medium.

For the purposes of the present invention, the term "X-Y plane" typically refers to the plane defined by holographic medium that encompasses the X and Y linear directions or dimensions. The X and Y linear directions or dimensions are typically referred to herein, respectively, as the dimensions known as length (i.e., the X-dimension) and width (i.e., the Y-dimension).

For the purposes of the present invention, the terms "Z-direction" and "Z-dimension" refer interchangeably to the linear dimension or direction perpendicular to the X-Y plane, and is typically referred to herein as the linear dimension known as thickness.

For the purposes of the present invention, the term "data modulator" refers to any device that is capable of optically representing data in one or two-dimensions from a signal beam.

For the purposes of the present invention, the term "spatial light modulator" (SLM) refers to a data modulator device that is an electronically controlled, active optical element.

For the purposes of the present invention, the term "refractive index profile" refers to a two-dimensional (X, Y) mapping of the refractive index pattern recorded in a holographic storage medium.

For the purposes of the present invention, the term "data beam" refers to a recording beam containing a data signal. As used herein, the term "data modulated beam" refers to a data beam that has been modulated by a modulator such as a spatial light modulator (SLM).

For the purposes of the present invention, the term "transmission" refers to transmission of a light beam from one component, element, article, etc., to another component, element, article, etc.

For the purposes of the present invention, the term "translate" refers to lateral or linear motion or movement along a linear longitudinal axis.

For the purposes of the present invention, the terms "motion" or "movement" refer interchangeably to any form of motion or movement, for example, linear movement, pivotal movement, etc.

For the purposes of the present invention, the terms "blocking" or "blocked" when used with reference to a light beam refer to preventing or substantially preventing the transmission, passage, etc., of the light beam, and may include deflecting, scattering, etc., the light beam in a different direction.

For the purposes of the present invention, the term "switching" refers to changing from one operating condition to another or different operating condition.

For the purposes of the present invention, the terms "passing" or "passed" when used with reference to a light beam refer to allowing, permitting, enabling, etc., the transmission, passage, etc., of the light beam.

For the purposes of the present invention, the term "magnet" refers to a component, part, material, etc., that produces a magnetic field and which generates a magnetic flux.

For the purposes of the present invention, the term "permanent magnet" refers to the conventional meaning of the term in that the magnet remembers how it was magnetized. Examples of permanent magnets may include rare-earth type permanent magnets such as, for example, NdFe magnets, samarium-cobalt magnets, ceramic magnets, etc., Alnico magnets, etc.

For the purposes of the present invention, the term "bidirectional magnet" refers to a magnet having two zones of magnetic polarization in opposite directions. A pair of magnets stacked such that the polarization of each magnet is oriented in opposite directions may function the same as a bidirectional magnet.

For the purposes of the present invention, the term "polarity" refers to the orientation of the north and south poles of a magnet. For a pair of adjacent magnets (e.g. side-by side, in a magnet stack, etc.) wherein the orientation of the north and south poles of each magnet are opposite, the pair of magnets is referred to herein as having opposite polarization. For a pair of adjacent magnets wherein the orientation of the north and south poles of each magnet are same, the pair of magnets is referred to herein as having matching polarization.

For the purposes of the present invention, the term "magnet stack" refers to a vertical arrangement of at least two (e.g., a pair of) magnets.

For the purposes of the present invention, the terms "NdFe magnet" and "neodymium magnet" refer interchangeably to a rare-earth-type permanent magnet comprising sintered neodymium, iron and small amounts of boron. NdFe magnets may have the highest energy product of any permanent magnetic material.

For the purposes of the present invention, the term "samarium-cobalt magnet" refers to a rare-earth-type permanent magnet comprising a sintered rare-earth magnetic material made of samarium and cobalt. Samarium-cobalt magnets are corrosion and temperature resistant.

For the purposes of the present invention, the term "ceramic magnets" refer to low cost rare-earth-type permanent magnet comprising a sintered composite of iron oxide and barium/strontium carbonate" refers to a comprising—A sintered rare-earth magnetic material made of samarium and cobalt. These magnets are corrosion and temperature resistant.

For the purposes of the present invention, the term "Alnico magnet" refers to a permanent magnet comprising a combination of aluminum, nickel and cobalt.

For the purposes of the present invention, the term "magnetic actuator" refers to a magnetic component, element, device, etc., that utilizes its magnetic field to create, cause, impart, etc., motion.

For the purposes of the present invention, the term "linear magnetic actuator" refers to a magnetic actuator that creates, causes, imparts, etc., linear displacement or linear motion.

For the purposes of the present invention, the term "eddy current" refers to an electrical phenomenon (induced current) that is caused when a moving (or changing) magnetic field intersects a conductor, or vice-versa. For example, an eddy current may be caused by a metallic object moving through a magnetic field. The relative motion of an eddy current causes a circulating flow of electrons, or current, within a conductor. These circulating eddies of current may create electromagnets with magnetic fields that oppose the effect of the applied magnetic field.

For the purposes of the present invention, the term "printed circuit board (PCB)" refers to a component comprising a non-conductive substrate, portion, surface, etc., for example, comprising a phenolic resin surface, a semiconductor, etc., and which mechanically supports and electrically connects various active electronic elements, components, etc., using conductive pathways, traces, etc. In some instances, these conductive pathways, traces, etc., may be etched, for example, from laminated copper-comprising sheets, may be photographically printed on the substrate, portion, surface, etc. PCBs may also be referred to interchangeably as printed wiring board (PWB), and etched wiring board.

For the purposes of the present invention, the term "damped suspension" refers to a suspension that dissipates energy of movement.

For the purposes of the present invention, the term "shutter" refers to a component, element, etc., which blocks, scatters, deflects, etc., a light beam (e.g., a laser beam), and may be a copper pad, other reflective material, etc., to block, scatter deflect, etc., the light beam.

For the purposes of the present invention, the term "field programmable gate array (FPGA)" refers to a device (e.g., semiconductor device) containing programmable logic components and programmable interconnects. The programmable logic components may be programmed to duplicate the functionality of basic logic gates such as AND, OR, XOR, NOT, etc., or more complex combinational functions such as decoders, simple mathematical functions, etc.

For the purposes of the present invention, the term "control of status register (CSR)" refers to control of a collection of flag bits for a processor that indicates the status of various mathematical or control operations.

For the purposes of the present invention, the term "shutter state machine" refers to a sequence of logic states, providing specific control functions, for electronically controlling the movement of the shutter member to pass a light beam (open) or block a light beam (close) in a programmed and controlled manner or fashion. An embodiment of a shutter state machine may comprise a finite state machine.

For the purposes of the present invention, the term "finite state machine (FSM)" refers to a model of behavior composed of a finite number of states, transitions between those states, and actions. With regard to a shutter state machine, the FSM prescribes limited or finite state sequences.

For the purposes of the present invention, the term "ringing" refers to an unwanted or undesired oscillation of the spring-mass system (e.g., suspension wires, shutter member, etc.) around the intended position.

For the purposes of the present invention, the term "linear regulation" refers to control of an operating point by an analog electronic device.

For the purposes of the present invention, the term "mechanical stop" refers to a mechanical device, component, element, etc., for controlling and limiting the movement of another device, component, element, etc., for example, a movable shutter member.

For the purposes of the present invention, the term "rebounding" refers to the conventional meaning of the term as an induced velocity opposite to the original velocity caused by contact with another object.

For the purposes of the present invention, the term "interval train" refers to a continuous series of individual control action pulses or logic level toggling.

For the purposes of the present invention, the term "tuning" refers to adjustments of one or more of the intervals, pulses, currents, times, etc., to obtain more optimum performance of the embodiments of the shutter device, system and/or method of the present invention.

For the purposes of the present invention, the terms "acceleration interval" or "acceleration pulse" refer to a current interval or current pulse that starts movement of the shutter member toward its intended destination or position.

For the purposes of the present invention, the terms "deceleration interval" or "deceleration pulse" refer to a current interval or current pulse which slows or retards movement of the shutter member as it approaches it intended destination or position.

For the purposes of the present invention, the terms "settling interval" or "settling pulse" refer to a current interval or current pulse (which may be in some embodiments an acceleration interval or acceleration pulse) which provides some drive capability to minimize and/or compensate for the effects of viscoelastic damping that may exist in a spring-mass system (e.g., suspension wires, shutter member, etc.).

For the purposes of the present invention, the term "eddy current damping" refers to use of eddy currents to dissipate energy of motion.

For the purposes of the present invention, the term "offset current" refers to a current pulse applied to hold the shutter member in position, other than its non-powered or resting position.

For the purposes of the present invention, the term "viscoelastic effects" refers to damping effects that change the resting position of a spring-mass system (e.g., suspension wires, shutter member, etc.) after an acceleration or deceleration pulse, even though the offset current remains fixed.

For the purposes of the present invention, the term "coil resistance" refers to the electrical resistance of the shutter coil.

For the purposes of the present invention, the term "driver" refers to an electrical circuit used to control current flow into and/or through the shutter coil.

For the purposes of the present invention, the term "spring rate" refers to the amount of deflection per force.

For the purposes of the present invention, the term "spring forces" refers to mechanical forces exerted by the suspension spring assembly (e.g., suspension wires) on the shutter member when displaced from its non-powered or rest position.

For the purposes of the present invention, the term "spring-mass system mode" refers to the natural or normal underdamped resonant response of the spring-mass system (e.g., suspension wires, shutter member, etc.).

For the purposes of the present invention, the term "linearly regulated current source" refers to an electronic circuit used to control electrical current by means of an analog electronic device, component, element, etc.

Description

Embodiments of the present invention may provide an electromechanical shutter device having improved performance and lifetimes by reducing the travel distance, and reducing the moving mass of the moving shutter member, but also optimizing the energy efficiency of the shutter device. This shutter device uses a shutter member which moves between light beam blocked and light beam passed positions, and which has associated therewith a light beam blocking member for blocking the light beam when the shutter member is moved to the light beam blocked position. A shutter coil associated with the shutter member may be energized by electrical current in the shutter coil to generate an electromagnetic force which interacts with the magnetic flux of one or more magnets of the shutter device to thereby cause movement of the shutter member between the light beam blocked and light beam passed positions.

Performance of the shutter device may also be increased by eliminating mechanical stops for controlling the position of the shutter member to block or pass the light beam, and instead using a shutter state machine to electronically control the movement of the shutter member between the light beam blocked and passed positions. This may be accomplished with the shutter state machine (e.g. as a finite state machine) by applying to the shutter device balanced acceleration/deceleration pulses and by applying an offset current pulse (i.e., a hold current pulse) at the end of the acceleration/deceleration pulse to more exactly balance the suspended spring-mass system (e.g. suspension wires, shutter member, etc.) restoring spring forces, i.e., those forces generated by displacing the suspended spring-mass system from its rest position. Further improvements may be obtained by using eddy current damping for the suspended spring-mass system to minimize or eliminate possible viscoelastic effects.

Embodiments of the shutter device of the present invention may utilize a linear magnetic actuator design which may be optimized by using a planar, relatively flat and thin, shutter coil. This shutter coil may be placed on (or may be formed or etched into), for example, a light weight printed circuit board (PCB) shutter member. (In some embodiments two shutter coils may be connected in series on opposite sides of the shutter member.) This shutter coil may be placed proximate to (or as close as possible to) the magnet(s), for example, a bidirectional magnet (e.g., having two zones of polarization in opposite directions) having high energy (e.g., an NdFe magnet), or two magnet stacks on opposite sides of the PCB shutter member with the magnet polarities oriented or configured to provide the functional equivalent of a bidirectional magnet. This bidirectional magnet or magnet stack configuration may insure that the majority of the shutter coil length is configured to interact with the magnetic flux of the magnet(s) to produce forces in the desired direction of travel (e.g., vertically up or down) of the shutter member. This may also maximize the applied force to the shutter member, while minimizing shutter coil resistance, and mass, which may lead to minimized power consumption of the shutter device, thus improving performance of the shutter device and increasing the lifetime thereof.

The magnet(s) of the shutter assembly provides a large magnetic field. This magnetic field generates a magnetic flux that is directed towards, intersects, and passes through the shutter coil, thus interacting with the electromagnetic force generated by electrical current passing through the shutter coil to cause the shutter member to move (e.g., vertically up or down) to intersect the light beam to block the beam path, or to move away from intersection of the light beam to open (i.e., pass) the beam path. In fact, the direction of movement of the shutter coil may be controlled by passing electrical current through the shutter coil in one direction to cause movement of the shutter member towards a light beam blocked position, and in the opposite direction to cause movement of the shutter member towards a light beam passed position. The shutter coil through which this drive current passes or flows may be attached to (e.g., may be formed, embedded or etched in) a PCB shutter member which provides a current path from the electrically conductive suspension springs (also referred to interchangeably as suspension wires), which may then carry this current from a stationary PCB anchor member connected to the drive electronics. In addition, the suspension springs/wires may determine the stiffness and affect the associated natural frequency of the suspended spring-mass system. The damping of the suspended spring-mass system may be provided by a closed conductive loop (e.g., comprising copper or other conductive material) on the PCB shutter member. This may act as a shorted turn in the magnetic field or flux that may provide eddy current damping for the suspension system.

Another aspect of the embodiments of the shutter device, system and method of the present invention may involve tuning of one or more of the hold and acceleration/deceleration pulses, intervals, etc., when electronically controlling the movement of the shutter member to minimize the ringing of the spring-mass system mode of the suspended spring-mass system. Employing mechanical stops to limit the movement or stroke of the shutter member may create rebounding and alignment problems with regard to the movement and positioning of the shutter member, thus a mechanism for limiting movement or stroke without mechanical stops may be employed to minimize or avoid these problems. To accomplish the desired shutter open and close times (i.e., where the light beam is passed or blocked) in embodiments of the system and method of the present invention, the movement of the shutter member may be electronically controlled (e.g., by using a finite shutter state machine) between light beam passed and light beam blocked positions without using mechanical stops. The spring rate (also known as the "spring constant") of the shutter device without mechanical stops may provide a pseudo stroke limiter of the movement of the shutter member, but the linear nature of the spring-mass system may cause ringing when a pulse train with frequency components close to the resonant frequency is applied. With careful tuning of one or more of the hold current and acceleration/deceleration pulses, intervals, etc., this ringing may be minimized.

Figure 2:
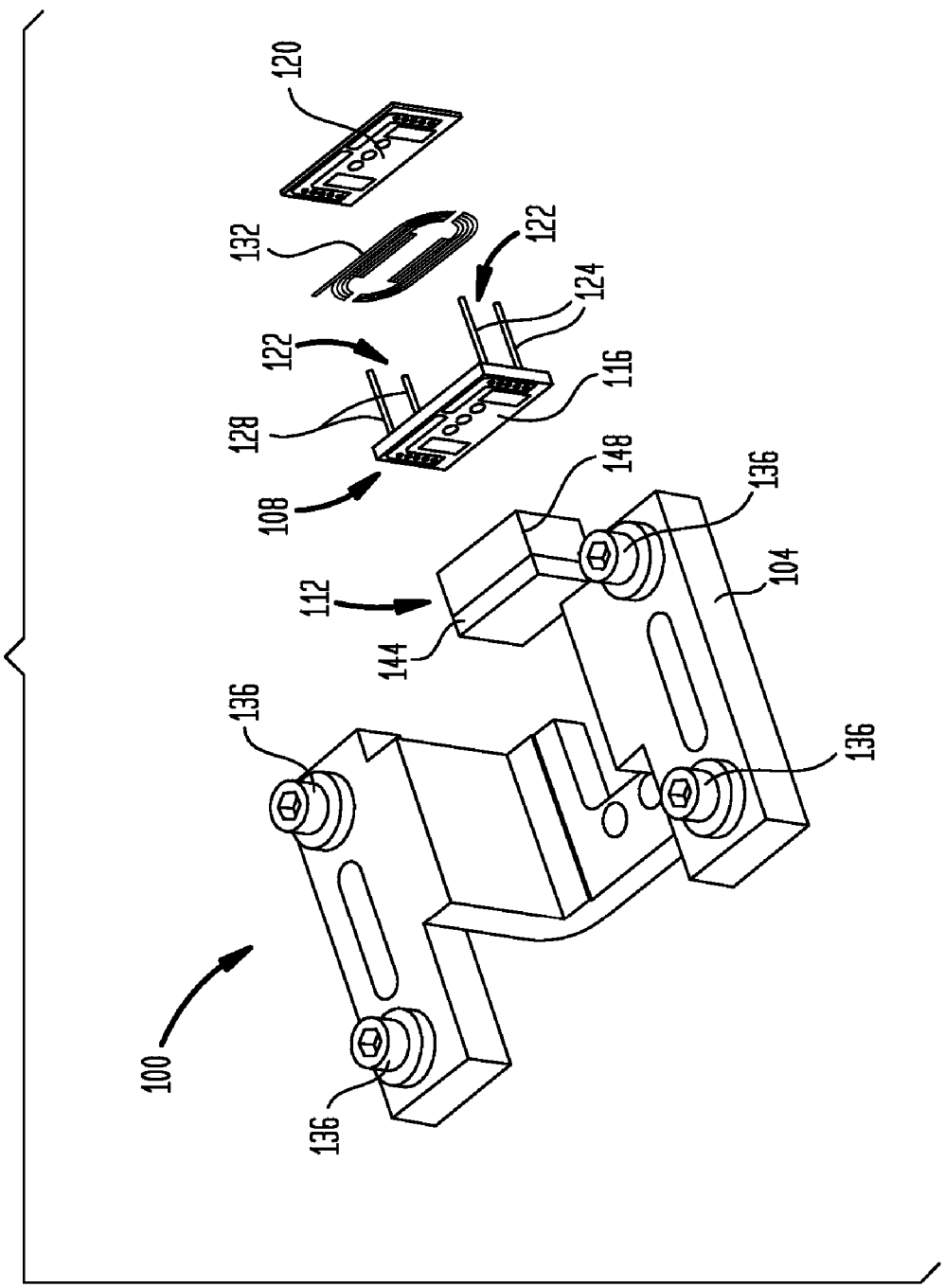
FIG. 2 is an exploded view of the shutter device of FIG. 1 to better illustrate the various components thereof.

An embodiment of the shutter device is illustrated and shown in FIGS. 1 and 2, which is referred to generally as 100. Referring to FIGS. 1 and 2, shutter device 100 comprises a base member, indicated as 104, and a shutter assembly indicated generally as 108. As particularly shown in FIG. 2, shutter assembly 108 generally comprises a magnet assembly, indicated as 112, an electrical current source member, for example, in the form of a stationary printed circuit board (PCB) anchor member (which may be connected other drive electronics not shown), indicated generally as 116, a vertically movable shutter member (which may also be referred to as a "shutter blade"), for example, in the form of a printed circuit board (PCB) shutter member, indicated generally as 120, a suspension spring assembly, indicated generally as 122, comprising a first pair of electrically conductive vertically spaced apart suspension wires, indicated as 124, and a second pair of electrically conductive vertically spaced apart suspension wires, indicated as 128, positioned on opposite sides of magnet assembly 112, and an electrically conductive generally oval-shaped shutter coil, indicated as 132, which may be associated with or formed into PCB shutter member 120, for example, by embedding or etching shutter coil 132 into PCB shutter member 120. Suspension wires 124 and 128 which may comprise copper, aluminum, gold, etc., are sufficiently flexible to bend and flex so that PCB shutter member 120, which is essentially tethered to PCB anchor member 116, may move vertically up or down. Shutter coil 132 may be formed with an appropriate number of windings or turns in either the clockwise or counterclockwise direction to generate the desired force. As further shown in FIGS. 1 and 2, base member 104 may be provided with height adjustors, of which four are shown and indicated as 136. Height adjustors may be used to adjust the position of the top of shutter assembly 108 appropriately relative to the path of the light beam to be blocked or passed. Base member 104 also has a generally U-shaped section 140 for receiving shutter assembly 108.

Figure 3:
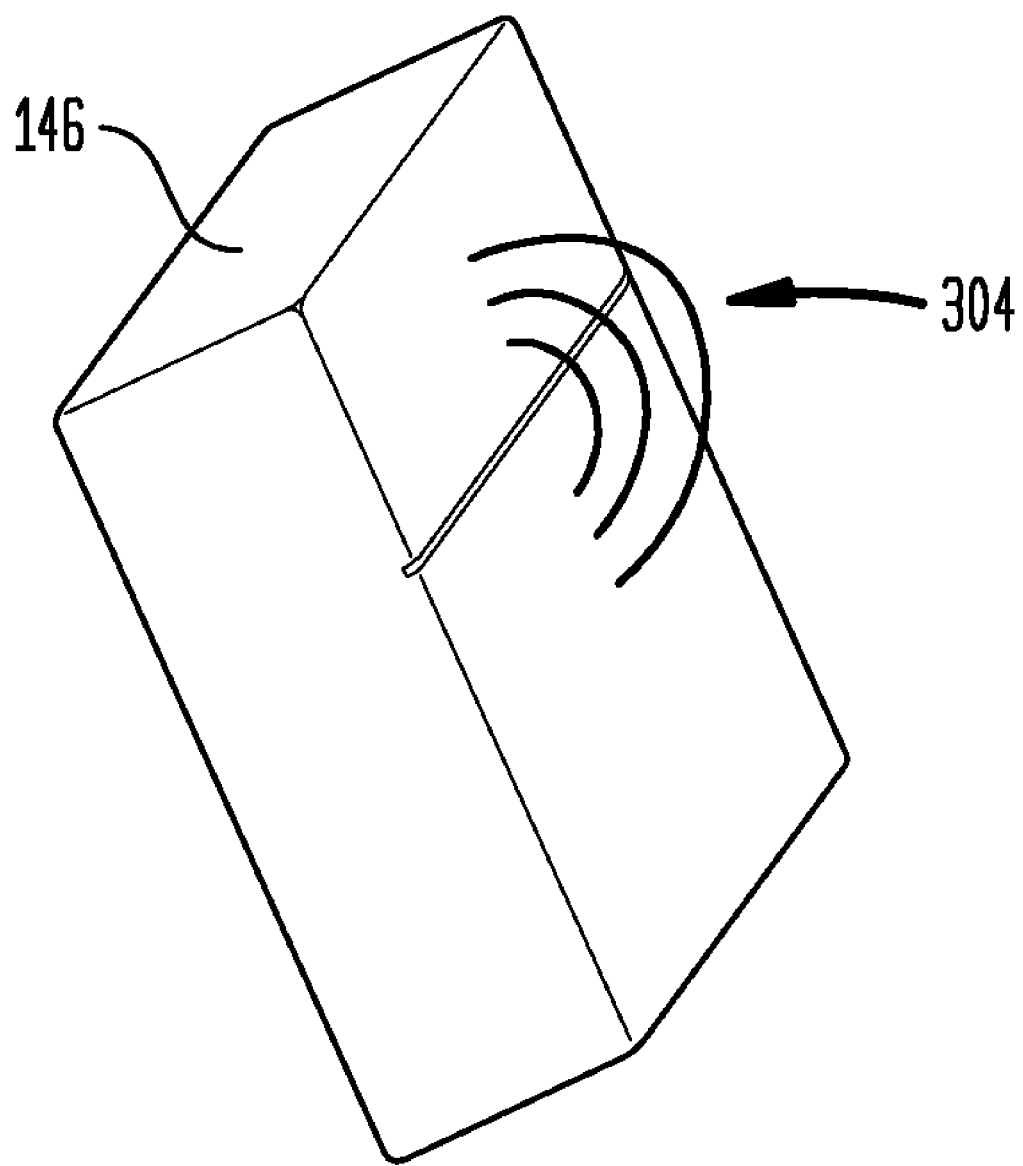
FIG. 3 is a perspective view illustrating the magnetic field generated by the magnet(s) of the shutter device of FIGS. 1 and 2.

Magnet assembly 112, which is shown in FIGS. 1 and 2 as being positioned between PCB anchor member 116 and shutter coil 132, may comprise a magnet backing plate, indicated as 144, and one or more generally squared-shaped magnets (e.g. permanent magnets), indicated as 146, which are proximate to shutter coil 132. The magnetic field which may be generated by magnet 146 is illustrated in FIG. 3, and is indicated as 304. Magnetic field 304 creates a magnetic flux which is directed towards, intersects and passes through shutter coil 132. When electrical current is passed or flows through shutter coil 132, an electromagnetic force is generated that interacts with the magnetic flux from magnet 146 to thus cause movement of PCB shutter member 120 vertically between light beam blocked and light beam passed positions. Because the pairs of suspension wires 124 and 128 are electrically conductive, suspension spring assembly 122 may pass electrical current from PCB anchor member 116 to PCB shutter member 120, and thus energize shutter coil 132 to generate this electromagnetic force. The particular direction of vertical movement (upward or downward) of PCB shutter member 120 is determined by the direction the electrical current passes or flows through shutter coil 132. Current flow through shutter coil 132 in one direction will cause PCB shutter member 120 to move upwardly, while current flow through shutter coil 132 in the opposite direction will cause PCB shutter member 120 to move downwardly. The particular direction of current flow through shutter coil 132 that causes upward (or downward) vertical movement will depend on the direction in which the magnetic flux from magnet 146 is directed at or towards shutter coil 132.

Figure 4:
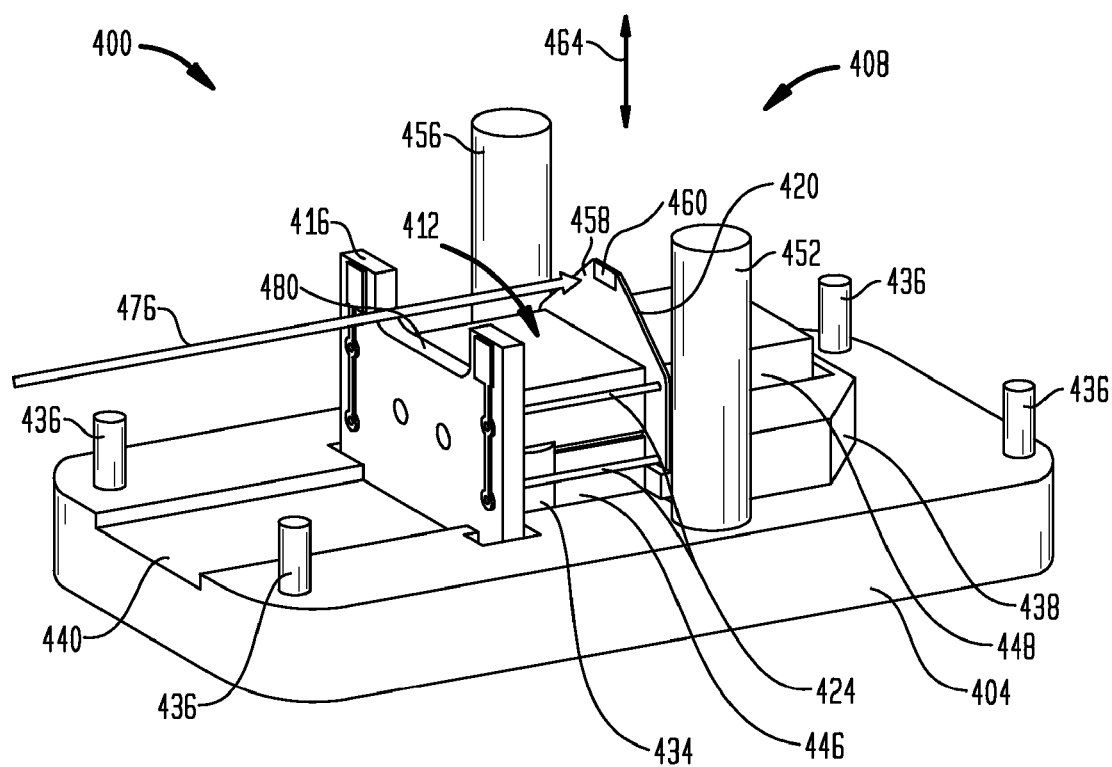
FIG. 4 is a perspective view of another embodiment of a electromechanical shutter device of the present invention.
Figure 5:
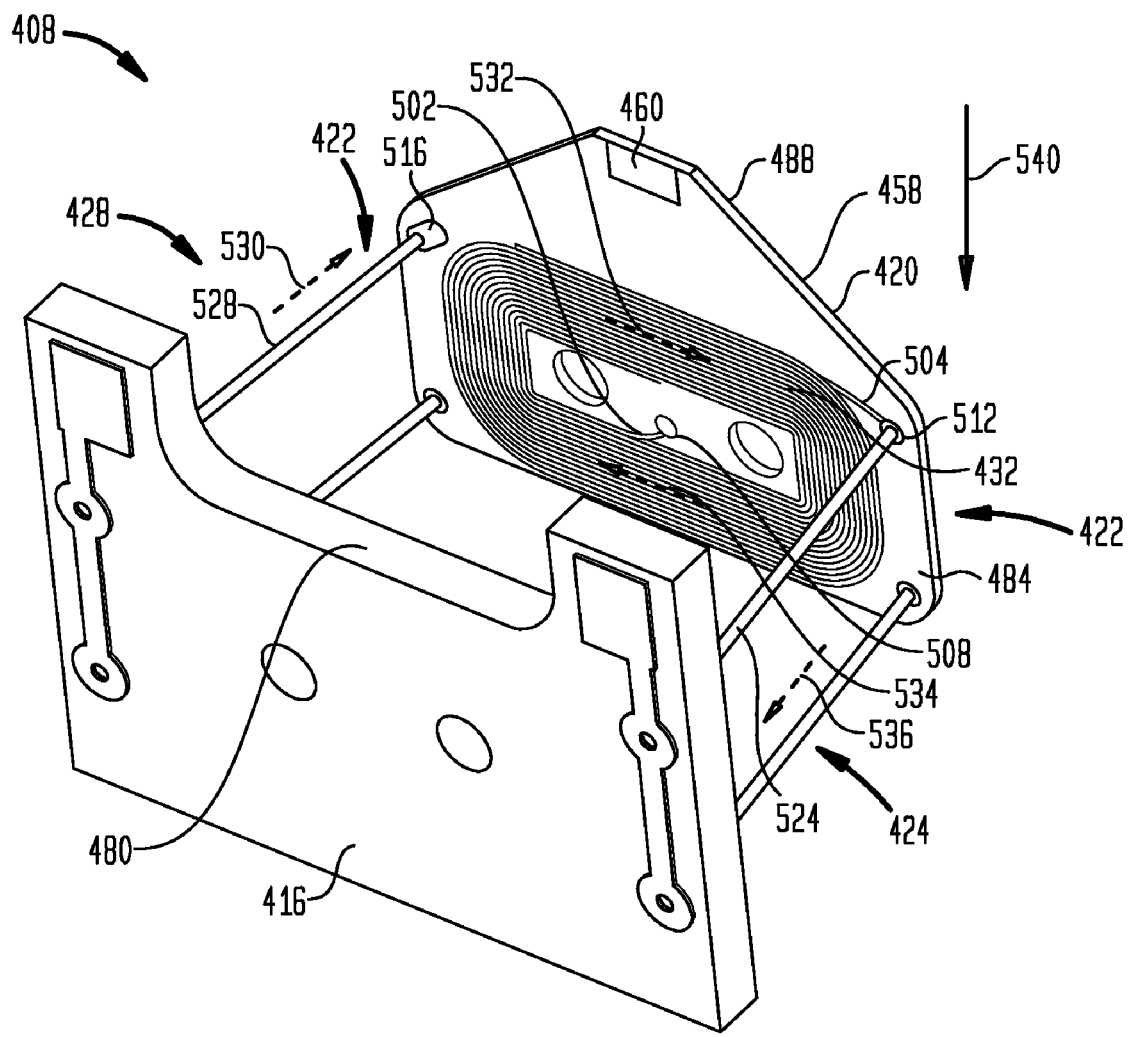
FIG. 5 is a perspective view of certain components of the shutter device of FIG. 4, showing the shutter coil energized to cause downward movement of the shutter member.
Figure 7:
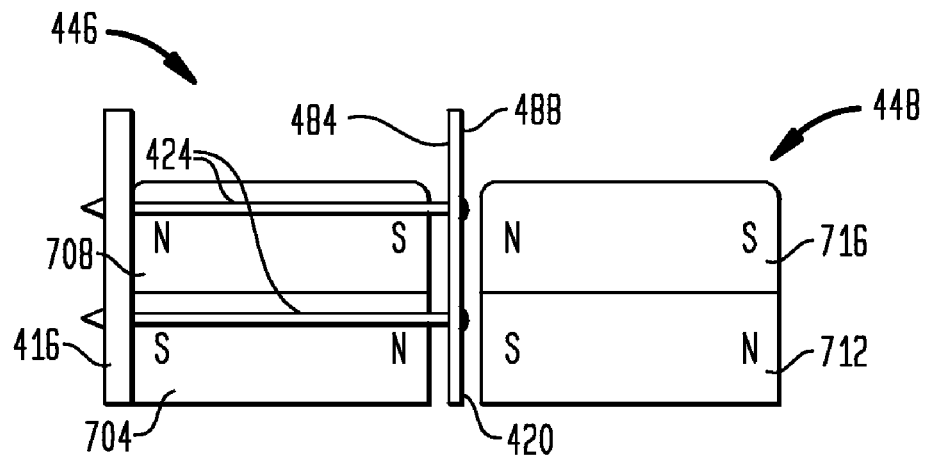
FIG. 7 is a side view of a portion of the shutter device of FIG. 4 illustrating the configuration of the magnets comprising the magnet stacks.
Figure 8:
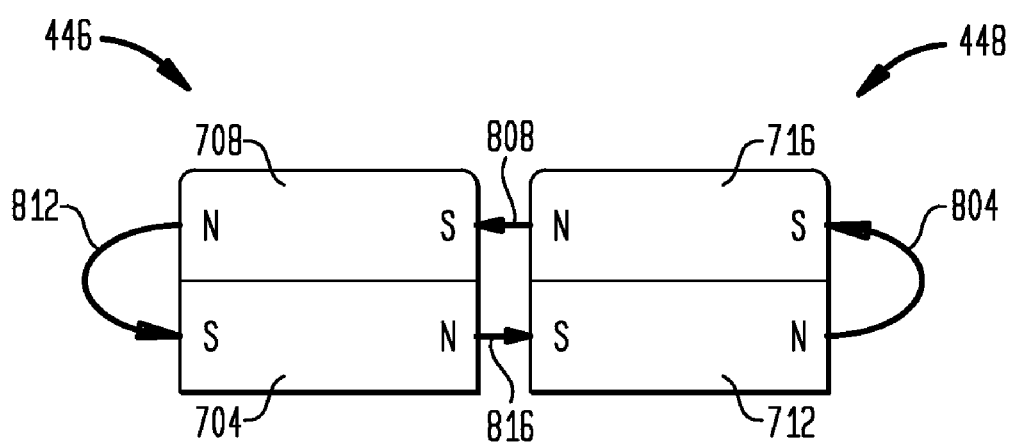
FIG. 8 is a side view illustrating the magnetic flux flow between the magnets comprising the magnet stacks shown in FIG. 7.
Figure 9:
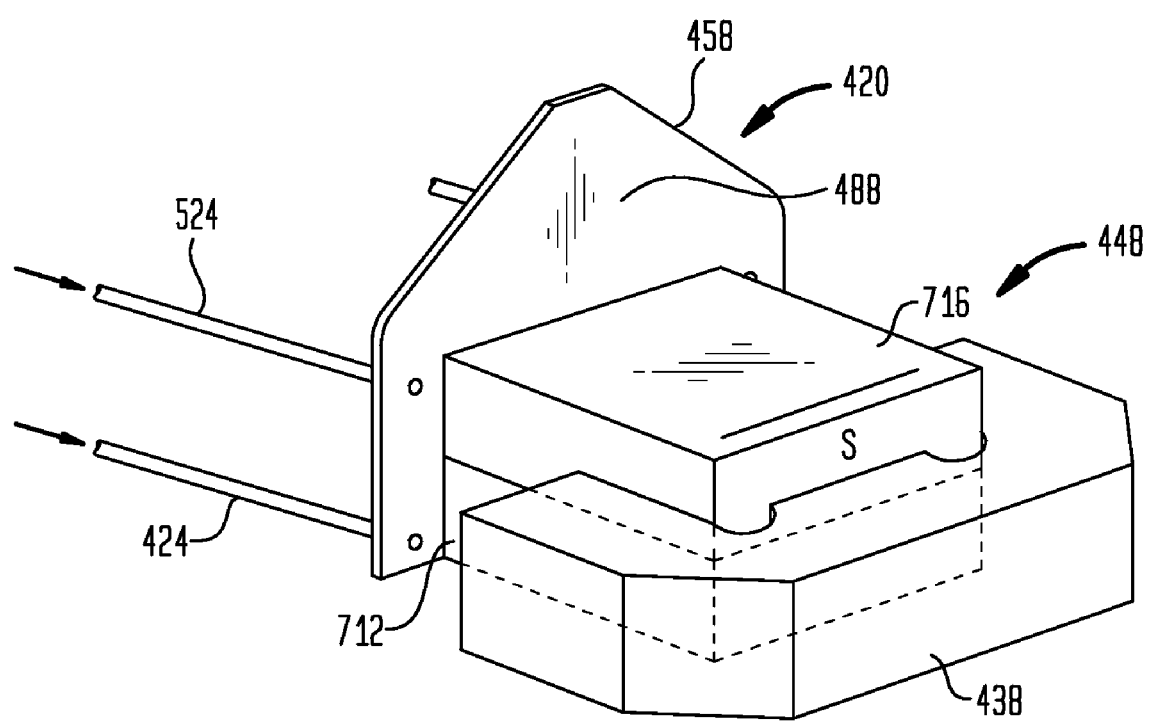
FIG. 9 is a perspective view of the rearward section of the shutter device of FIG. 4 illustrating in more detail certain components of the device.

Another embodiment of the shutter device is illustrated and shown in FIGS. 4 through 9, and is referred to generally as 400. Referring to FIGS. 4-5 and 9, shutter device 400 comprises a base member, indicated as 404, and a shutter assembly indicated generally as 408. Shutter assembly 408 generally comprises a magnet assembly, indicated generally as 412, which comprises a pair of magnet stacks, indicated respectively as 446 and 448. Shutter assembly 408 further comprises an electrical current source member in the form of, for example, a generally square-shaped printed circuit board (PCB) stationary anchor member (which may be connected other drive electronics not shown), indicated generally as 416, a vertically movable shutter member, for example, in the form of a generally pentagon-shaped printed circuit board (PCB) shutter member, indicated generally as 420, a suspension spring assembly, indicated generally as 422, comprising a first pair of electrically conductive suspension wires, indicated as 424, and a second pair of electrically conductive suspension wires, indicated as 428, and an electrically conductive generally oval-shaped shutter coil, indicated as 432. Shutter coil 432 is associated with or formed into PCB shutter member 420, for example, by embedding, etching, etc., the shutter coil 432 into PCB shutter member 420. Suspension wires 424 and 428 may have the same or similar characteristics to the suspension wires 124 and 128 of FIGS. 1 and 2. As further shown particularly in FIG. 4, magnet stacks 446 and 448 are positioned on opposite sides of shutter member 420.

As further shown in FIGS. 4-5 and 9, base member 404 may be provided with connector pins which may be used for connecting, attaching, etc., base member 404 to the remainder of the system (e.g. laser assembly, holographic data storage system, etc.). Four such connector pins are shown in FIG. 4 and are indicated as 436. Base member 404 may also be provided with a pair of spaced apart alignment pins, indicated respectively as 452 and 456, for aligning the connection, attachment, etc., of shutter device 400 to the remainder of the system. Base member 404 may also be provided with magnet stack retainment members, indicated as 434 and 438, for retaining, respectively, magnet stacks 446 and 448, as well as a recess 440 for receiving shutter assembly 408 that extends from the forward end to the rearward end of base member 404.

As further shown particularly in FIGS. 4-5 and 9, PCB shutter member 420 has a generally triangular-shaped upper portion, indicated as 458, which may be provided with a light beam blocking member, for example, in the form of a generally rectangular-shaped shutter, indicated as 460. Shutter 460 may comprise a copper pad or other light beam blocking material, and may be positioned at or proximate to the upper corner thereof of upper portion 458. (Although not shown in shutter device 100 in FIGS. 1-2, the upper portion of PCB shutter member 120 may also be provided with a similar shutter.) Double headed arrow 464 indicates the vertical movement (e.g., up or down) of PCB shutter member 420 between light beam blocked and light beam passed positions. The direction of the light beam to be blocked or passed is shown by arrow 476 in FIG. 4. PCB anchor member 416 may also be provided with an upper recess or gap, indicated as 480, to permit light beam 476 to travel unblocked towards upper portion 458 of PCB shutter member 420. As further shown particularly in FIG. 5, shutter member 420 has opposite sides 484 and 488, with side 484 being closest magnet stack 446, and side 488 being closest to magnet stack 448. Shutter coil 432 is also shown as being formed in side 484 (i.e., closest to magnet stack 446).

Referring to FIG. 5, shutter coil 432 is shown as being wound outwardly in the clockwise direction relative to side 484 (but may also be wound in the opposite counterclockwise direction), starting at an inner segment, indicated as 502, and ending at an outer segment, indicated as 504. Inner segment 502 is connected to electrical contact point 508, while outer segment 504 is connected to electrical contact point 512 at or proximate to the lower left corner (from side 484) of upper portion 458. Although not shown, contact point 508 may be further connected by a circuit on side 488 of PCB shutter member 420 which then connects to a another electrical contact point 516 at or proximate to the lower right corner (from sided 484) of upper portion 458. As further shown in FIG. 5, contact point 512 may be connected to the upper wire 524 of suspension wires 424, while contact point 508 may be connected to the upper wire 528 of suspension wires 428. Dashed arrows 530, 532, 534 and 536 indicate, respectively, the direction of the passage or flow of electrical current through upper wire 528, the lower half of shutter coil 432, the upper half of shutter coil 432, and the upper wire 524 to cause downward vertical movement of PCB shutter member 420, as indicated by downward arrow 540. Conversely, dashed arrows 630, 632, 634 and 636 in FIG. 6 indicate, respectively, the direction of a reverse passage or flow of electrical current through upper wire 524, the upper half of shutter coil 432, the lower half of shutter coil 432, and through upper wire 524 to cause upward vertical movement of PCB shutter member 420, as indicated by upward arrow 640.

Figure 6:
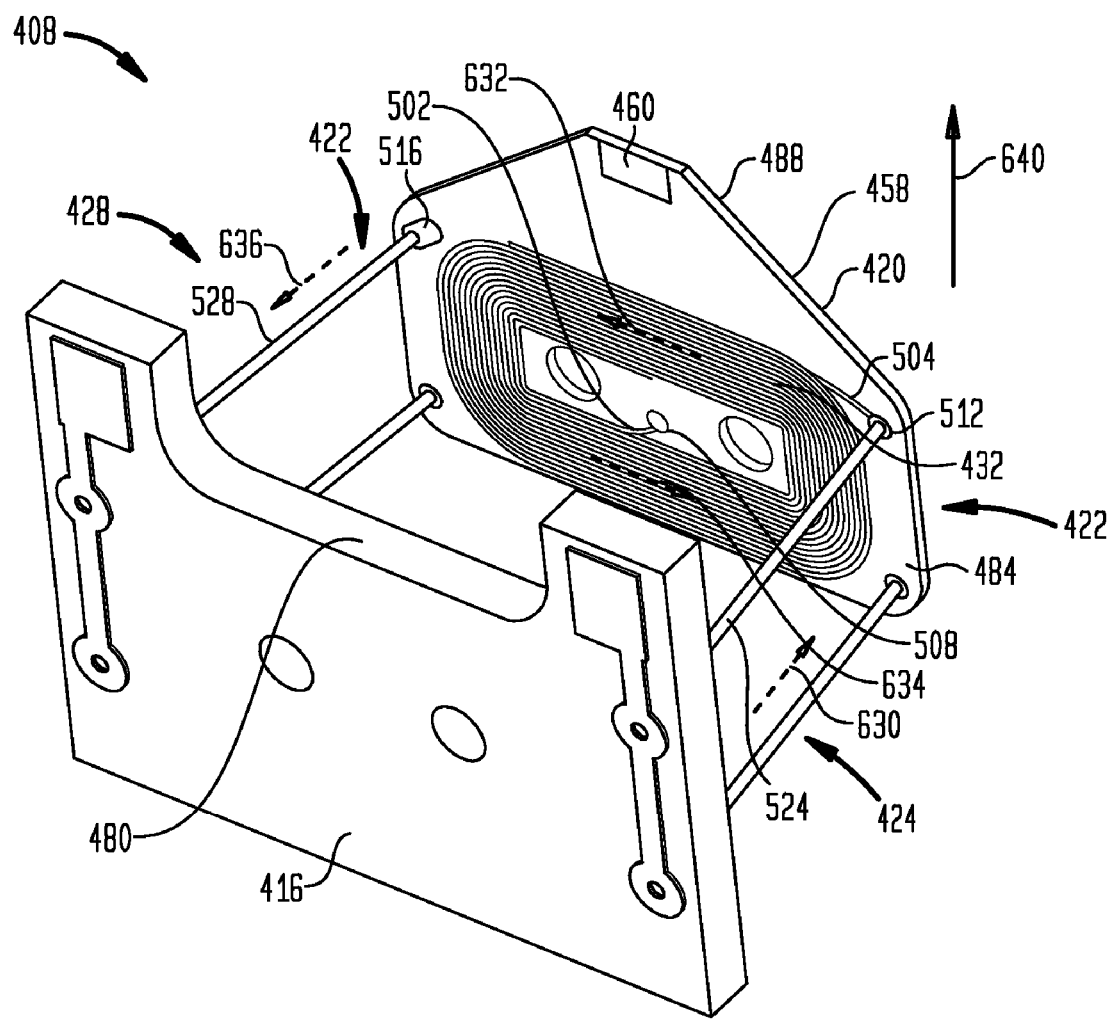
FIG. 6 is a similar view to FIG. 4, but showing the shutter coil energized to cause upward movement of the shutter member.

The reason why the flow of electrical current (shown by dashed arrows 530, 532, 534 and 536) in FIG. 5 causes downward vertical movement of PCB shutter member 420, while the flow of electrical current (shown by dashed arrows 630, 632, 634 and 636) in FIG. 6 causes upward vertical movement of PCB shutter member 420 is due to the interaction of the respective electromagnetic force generated by shutter coil 432 with magnet stacks 446 and 448, and particularly the flow of magnetic flux created by magnet stacks 446 and 448, as further illustrated in FIGS. 7 through 9, and especially in FIGS. 7 and 8. Referring to FIGS. 7 through 9, magnet stacks 446 and 448 each comprise a pair of magnets (e.g. permanent magnets), for example, lower magnet 704, and upper magnet 708 for magnet stack 446, and lower magnetic 712 and upper magnet 716 for magnet stack 448. As particularly shown in FIGS. 7 and 8, the north and south poles of magnet pair 704/708 (as well as magnet pair 712/716) are oriented with respect to each other to have an opposite polarization. As also shown in FIGS. 7 and 8, the north and south poles of each of the lower magnets 704 and 712, as well as the upper magnets 708 and 716, are oriented to have an opposite polarization. As a result, and as shown in FIG. 8, the magnetic flux for the pair of magnet stacks 446 and 448, moves counterclockwise in the direction indicated by arrows 804, 808, 812 and 816, so as intersect and pass through shutter coil 432 such that the magnetic flux flow indicated by arrow 816 passes through and intersects the lower section of shutter coil 432, while the magnetic flux flow indicated by arrow 808 passes through and intersects the upper section of shutter coil 432. By using magnet stacks 446 and 448 with the pairs of magnets 704/708 and 712/716, as illustrated in FIGS. 7 and 8, and directing the magnetic flux flow, as shown by arrows 804 through 816 in FIG. 8, the magnetic flux directed at, intersecting and passing through shutter coil 432 may be more concentrated and more efficient (e.g., as much as twice as efficient). It should also be understood that the particular orientation of the north an south poles of magnets 704, 708, 712 and 716 shown in FIGS. 7 and 8 is merely illustrative and may be reversed, thus causing the magnetic flux flow to move in the reverse, clockwise direction; this would also result in the vertical movement of PCB shutter member 420 being reversed from that shown and described in FIGS. 5 and 6.

In an alternative embodiment of shutter device 400 to that shown in FIGS. 4-9, a second shutter coil similar to shutter coil 432 formed in or on side 484, may also be formed in or on side 488 of shutter member 420. In this alternative embodiment, outer segment 504 on shutter coil 432 on side 484 may, instead, be connected at contact point 516 and may be wound inwardly in the clockwise direction to inner segment 502 at contact point 508. Inner segment 502 would then be connected to the inner segment of the second shutter coil on side 488 through contact point 508. This second shutter coil may then be wound outwardly in the clockwise direction (if viewed from side 484) or the counterclockwise direction (if viewed from side 488) to an outer segment connected at contact point 516. In other words, the second shutter coil on side 488 of shutter member 420 would be electrically connected in series to shutter coil 432 on side 484, thus increasing the number of coil turns or area for generating the electromagnetic force that interacts with the magnetic flux generated by magnet stacks 446 and 448 on either side (i.e., 484 and 488) of shutter member 420. This may increase the amount of force generated per given amount of current, or may decrease the amount power for a given amount of force.

The operation of, for example, shutter device 100 of FIGS. 1 through 2 or shutter device 400 of FIGS. 4 through 9, and especially the vertical movement (upward or downward) of respective PCB shutter members 120 and 420, may be controlled electronically by a shutter state machine to move shutter members 120/420 between the light beam blocked and light passed positions, and without any mechanical stops. For example, the shutter state machine may observe that the shutter device is in a state which corresponds to the shutter member 120/420 being in closed position (i.e., blocking light beam 476). When the shutter state machine observes the assertion of enable signals from other FPGA's within the system (e.g., holographic data storage system), the shutter state machine may initiate a sequence to cause the shutter device to be open (i.e., pass the light beam 476) by driving shutter member 120/420 through, for example, various acceleration and deceleration states. When the member 120/420 reaches a state corresponding to the shutter device being fully open, thus allowing light to pass to the storage medium, the shutter state machine may signal the data storage system that holograms (e.g., holographic data) may now be recorded to or read from the storage medium. Subsequently, when the hologram has been recorded to or read from the storage medium, and when the shutter state machine observes a deassertion of the enable signal, the shutter state machine may initiate a sequence that then closes the shutter device (i.e., blocks light beam 476).

Figure 10:
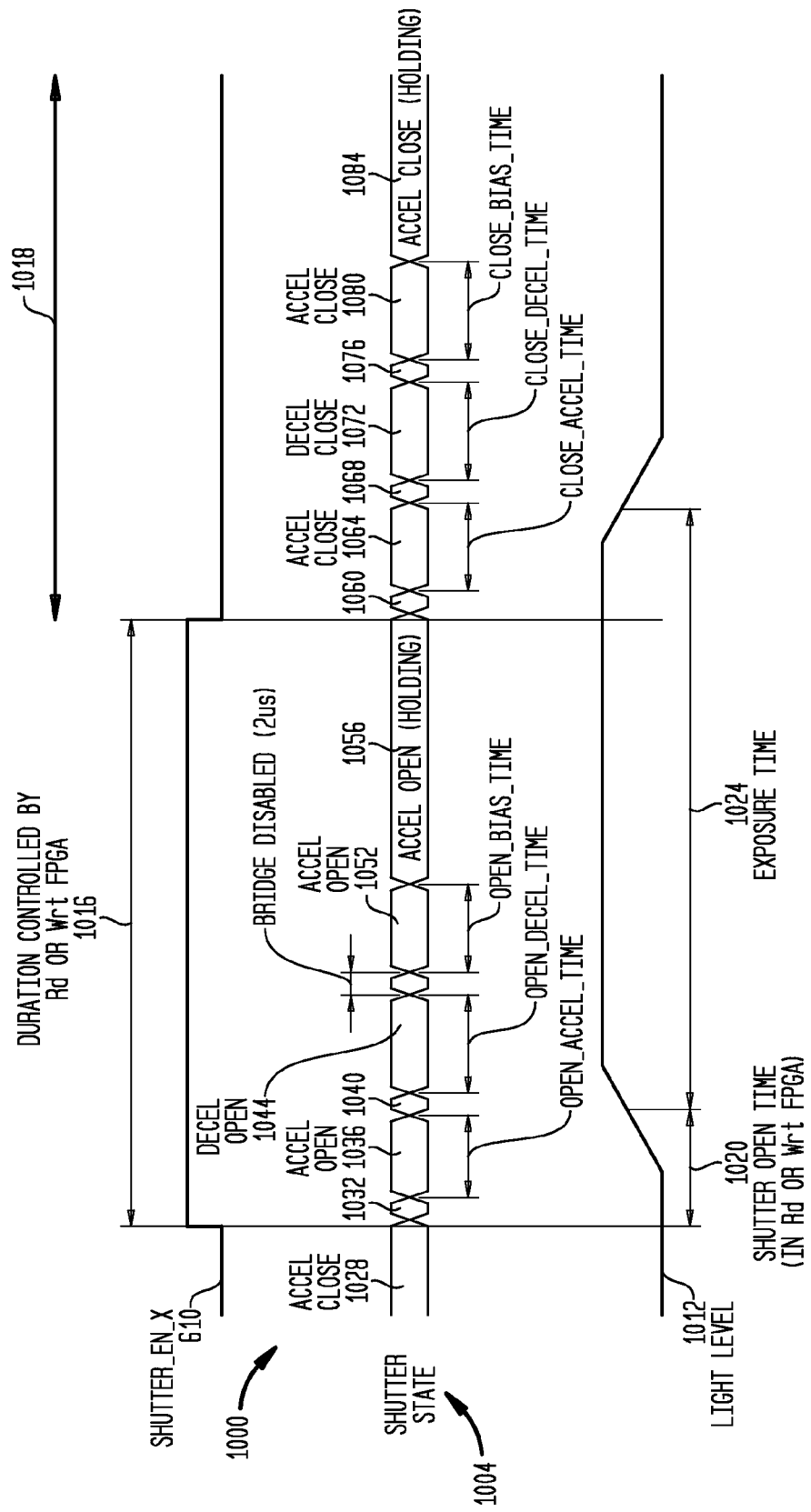
FIG. 10 is a schematic diagram illustrating an embodiment of the operation of a shutter device according to the various embodiments of the present invention electronically controlled by a shutter state machine.

An embodiment of the operation of, for example, shutter devices 100/400, controlled by a shutter state machine is shown schematically in FIG. 10, and is referred to generally as 1000. Referring to FIG. 10, diagram 1000 has along the center thereof a shutter state indicator component, which is indicated generally as 1004 and which shows the various intervals and inputs during the operation of the shutter device, as well as a light level indicator component, which is indicated generally by 1012 and which shows the amount of light being transmitted by the shutter device at a given point in the operation. The double headed arrow, indicated as 1016, represents the period corresponding to the shutter opening segment (i.e., passing the light beam) of the shutter device operation, while the double headed arrow, indicated as 1018, represents the period corresponding to the shutter closing segment (i.e., blocking the light beam) of the shutter device operation. The double headed arrow, indicated as 1020, represents the time interval required to allow at least 50% transmission of light by the shutter, while the double headed arrow, indicated as 1024, represents the exposure time interval (e.g., for writing holograms (e.g., holographic data) to or reading holograms from the storage medium when the shutter is fully opened and 100% light transmissive).

Interval 1028 corresponds to the end of the previous shutter closing segment, and prior to shutter opening segment 1016. Shutter opening segment 1016 may comprise intervals 1032, 1036, 1040, 1044, 1048, 1052 and 1052. Intervals 1032, 1040, and 1048 represent when the shutter opening segment 1016 is in a dwell or non-active state between adjacent acceleration and deceleration portions. Interval 1036 represents the acceleration portion of an open shutter event motion. Interval 1044 represents the deceleration portion of an open shutter event motion. Interval 1052 represents a second acceleration or settling pulse portion of an open shutter event motion. Interval 1056 represents a hold electrical current portion of an open shutter event.

Similar to shutter opening segment 1016, shutter closing segment 1018 comprises intervals 1060, 1064, 1068, 1072, 1076, 1080 and 1084. Intervals 1060, 1068, and 1076 represent when the shutter closing segment 1018 is in a dwell or non-active state between adjacent acceleration and deceleration portions. Interval 1064 represents the acceleration portion of a close shutter event motion. Interval 1072 represents the deceleration portion of a close shutter event motion. Interval 1080 represents a second acceleration or settling pulse portion of a close shutter event motion. Interval 1084 represents a hold current portion of a close shutter event.

In operation of the shutter device, the duration of the control input signals during either the shutter opening segment 1016 or the shutter closing segment 1018 may be controlled by CSRs within the respective write (record) or read FPGA of the shutter state machine. These FPGA's also provide appropriate delay between the assertion of their respective enable signal and when the shutter of device 100/400 has opened sufficiently for exposure of the holographic medium to begin, e.g., during time interval 1024. Similarly, the write (record) and read FPGA's also comprehend when the shutter of device 100/400 remains partially open following the deassertion of the enable signal. Finally, each FPGA refrains from re-asserting its enable signal for at least the time required to close the shutter of devices 100/400 and thus return the shutter device to a low drive acceleration close state (i.e., interval 1084 in FIG. 10).

The only time durations over which the Optical-Mechanical Assembly (OMA) FPGA has direct control are those shown along shutter state segment 1004 from interval 1032 through interval 1052 and from interval 1060 through interval 1080 in FIG. 10. In addition, there is a pause time value not directly shown in FIG. 10; this time value controls the duration of deadtime between acceleration and deceleration for both the opening and closing of shutter devices 100/400. The durations for each of intervals 1032 through intervals 1052, and for each of intervals 1032 through intervals 1052 may be specified by using predetermined or calibrated CSR values. The predetermined or calibrated values for these CSRs may be determined during the tuning process for each particular shutter device.

Figure 11:
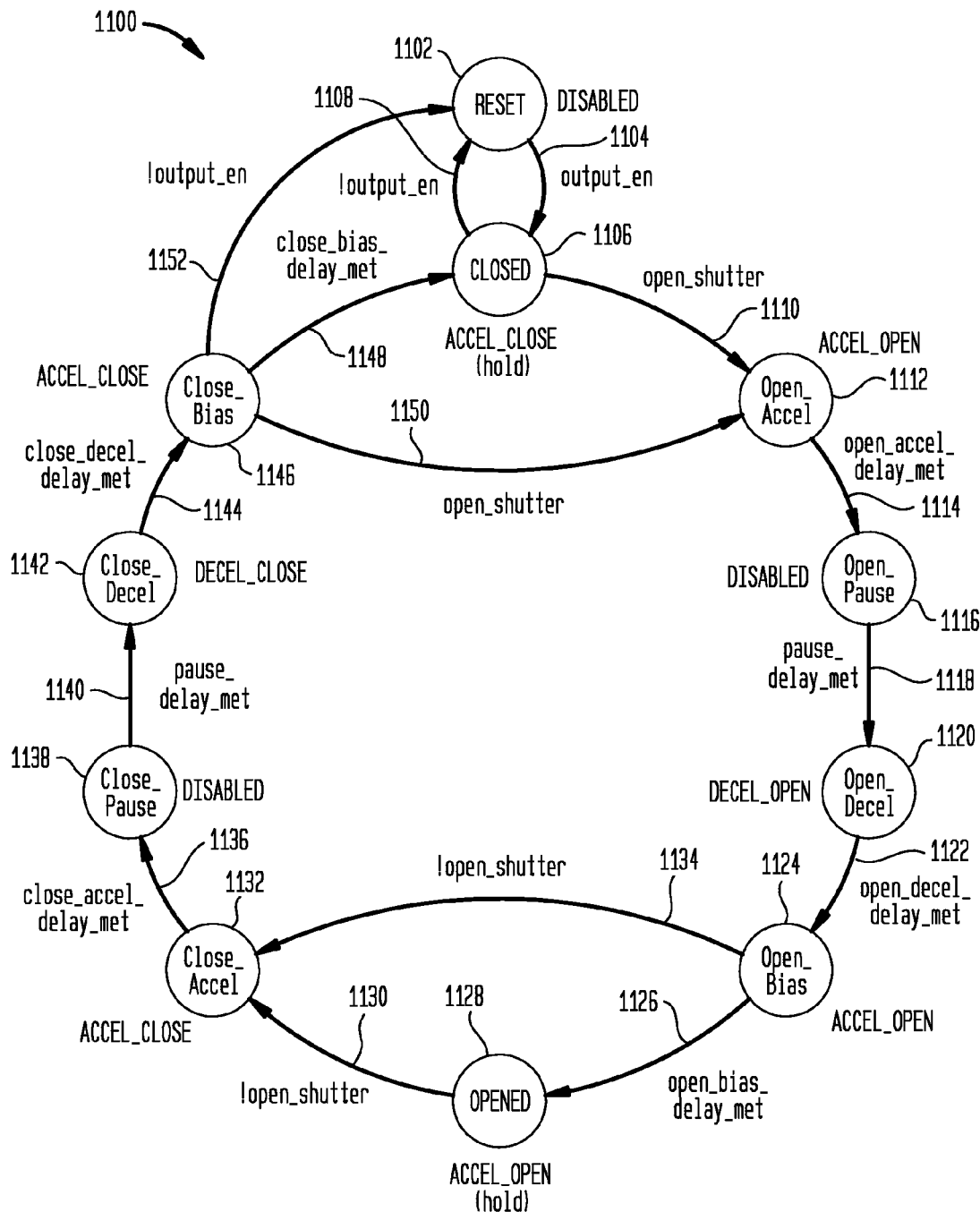
FIG. 11 is a schematic diagram illustrating an embodiment of a finite state machine for electronically controlling embodiments of electromechanical shutter devices of the present invention.

FIG. 11 is a schematic diagram to illustrate potential sequences and states of the shutter state machine, as prescribed by a finite state machine (FSM), in electronically controlling shutter devices 100/400, and which is indicated generally as 1100. As shown in FIG. 11, circle 1102 shows the shutter device in either a disabled or reset state. If it is desired to energize the shutter device, the FSM sends a signal, as indicated by arrow 1104. Assuming that the shutter is in a closed (light beam blocked) position, as indicated by circle 1106, an "open shutter" sequence may be initiated, starting with an initiation signal, as indicated by arrow 1110, which causes an acceleration opening pulse to be sent to the shutter device, as indicated by circle 1112. Once the acceleration opening pulse 1112 has been performed, a pause signal may be initiated, as indicated by arrow 1114, which terminates the acceleration opening pulse, as indicated by circle 1116. Following pause 1116, another signal may be sent, as indicated by arrow 1118, to cause a deceleration opening pulse to be sent to the shutter device, as indicated by circle 1120. Once the deceleration opening pulse 1120 is performed, another signal may be sent, as indicated by arrow 1122, to cause a second acceleration opening pulse (which corresponds a settling pulse) to be sent to the shutter device, as indicated by circle 1124. After settling pulse 1124 is performed, a hold signal may be initiated a hold signal, indicated by arrow 1126, at which point the shutter is held in a fully opened position, as indicated by circle 1128.

In order to initiate a sequence closing the shutter device, a signal may be initiated, as indicated by arrow 1130, which causes an acceleration pulse to be sent to the shutter device, as indicated by circle 1132, to start closing the shutter. (As also indicated in FIG. 11, in an alternate pathway, a signal may be initiated, as indicated by arrow 1134, directly after pause 1124 to cause an acceleration closing pulse 1132). Once the acceleration closing pulse 1132 has been performed, a pause signal may be initiated, as indicated by arrow 1136, which terminates acceleration closing pulse 1132, as indicated by circle 1138. Following pause 1138, another signal may be sent, as indicated by arrow 1140, to cause a deceleration closing pulse to be sent to the shutter device, as indicated by circle 1142. Once the deceleration closing pulse 1142 is performed, another signal may be initiated, as indicated by arrow 1144, to cause a second acceleration closing pulse (which corresponds to a settling pulse) to be sent to the shutter device, as indicated by circle 1146. After settling pulse 1146 is performed, a hold signal may be initiated, as indicated by arrow 1148, at which point the shutter is held in a fully closed position, as indicated by circle 1106. Alternatively, a new shutter opening sequence may be initiated, as indicated by arrow 1150, to cause an acceleration opening pulse, or a signal may be sent to initiate disable or shutdown sequence with the shutter device, as indicated, by arrow 1152.

To minimize ringing of the system, for example, when the pulse train is close to resonance frequency is applied, an embodiment of the system and method of the present invention may involve tuning of one or more of the hold and acceleration/deceleration pulse amplitudes, intervals, currents, etc. To accomplish such tuning, the driver may include a regulated current source which controls the acceleration, deceleration and hold pulse amplitudes to the shutter (e.g., those intervals and pulses illustrated in FIGS. 10 and 11 above). For example, tuning may be accomplished by minimizing the spectral content of the regulated pulse train in the vicinity of the natural frequency of the shutter (i.e., the suspended spring-mass mode).

Embodiments of the shutter device of the present invention, for example, shutter devices 100 and 400, may be used in holographic data storage or memory systems which employ shutters for blocking and unblocking (passing) light beams (e.g., laser beams) for controlling exposure times of holographic storage media during writing (recording) or reading of holographic data. For example, shutter devices 100 and 400 may be employed in place of exposure shutter 208 of the holographic memory system described in commonly-assigned Published U.S. Patent Application No. 2006-0291023 (Riley et al.), published Dec. 28, 2006, the entire disclosure and contents of which is hereby incorporated by reference.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A system comprising an electromechanical shutter device comprising a base member and a shutter assembly associated with the base member, the shutter assembly comprising:
   an electrical current source member associated with the base member;
   a shutter member spaced apart from and movable with respect to the electrical current source member between a light beam blocked position and a light beam passed position;
   a light beam blocking member associated with the shutter member for blocking a light beam when the shutter member is moved to the light beam blocked position and for not blocking the light beam when the shutter member is moved to the light beam passed position;
   a shutter coil associated with the shutter member which generates an electromagnetic force when energized;
   at least one magnet positioned proximate to the shutter coil and which generates a magnetic flux directed towards and intersecting the shutter coil;
   electrically conductive means connecting the electrical current source member to the shutter member for passing electrical current from the electrical current source member to the shutter member to energize the shutter coil and to control movement of the shutter member between the light beam blocked position and the light beam passed position;
   wherein when the shutter coil is energized, an electromagnetic force is generated by the shutter coil which interacts with the magnetic flux to thereby cause movement of the shutter member between the light beam blocked position and the light beam passed position; and
   a shutter state machine which electronically controls the movement of the shutter member between the light beam blocked position and the light beam passed position, wherein the light beam blocking member: (1) blocks the light beam when the shutter member is in the light beam blocked position; or (2) does not block the light beam when the shutter member is in the light beam passed position,
   wherein the shutter state machine initiates a sequence comprising one or more acceleration or deceleration intervals to cause the shutter member to move towards either the light beam blocked position or the light beam passed position.

2. The system of claim 1, wherein the shutter state machine initiates a sequence comprising, in order, an acceleration interval, a deceleration interval, and settling interval to cause the shutter member to move towards either the light beam blocked position or the light beam passed position.

3. The system of claim 2, wherein the sequence further comprises a hold current interval after the settling interval.

4. The system of claim 3, wherein one or more of the intervals, currents and pulse amplitudes of one or more of the acceleration, deceleration, settling and hold current intervals are tuned to minimize ringing.

5. The system of claim 1, wherein the sequence comprises a non-active state between adjacent acceleration and deceleration intervals.

6. A system comprising an electromechanical shutter device comprising a base member and a shutter assembly associated with the base member, the shutter assembly comprising:
   an electrical current source member associated with the base member;
   a shutter member spaced apart from and movable with respect to the electrical current source member between a light beam blocked position and a light beam passed position;
   a light beam blocking member associated with the shutter member for blocking a light beam when the shutter member is moved to the light beam blocked position and for not blocking the light beam when the shutter member is moved to the light beam passed position;
   a shutter coil associated with the shutter member which generates an electromagnetic force when energized;
   at least one magnet positioned proximate to the shutter coil and which generates a magnetic flux directed towards and intersecting the shutter coil;
   electrically conductive means connecting the electrical current source member to the shutter member for passing electrical current from the electrical current source member to the shutter member to energize the shutter coil and to control movement of the shutter member between the light beam blocked position and the light beam passed position;

wherein when the shutter coil is energized, an electromagnetic force is generated by the shutter coil which interacts with the magnetic flux to thereby cause movement of the shutter member between the light beam blocked position and the light beam passed position; and a shutter state machine which electronically controls the movement of the shutter member between the light beam blocked position and the light beam passed position, wherein the light beam blocking member: (1) blocks the light beam when the shutter member is in the light beam blocked position; or (2) does not block the light beam when the shutter member is in the light beam passed position, wherein holographic data is recorded in a holographic storage medium when the shutter member is in the light beam passed position.

7. A system comprising an electromechanical shutter device comprising a base member and a shutter assembly associated with the base member, the shutter assembly comprising:

an electrical current source member associated with the base member;

a shutter member spaced apart from and movable with respect to the electrical current source member between a light beam blocked position and a light beam passed position;

a light beam blocking member associated with the shutter member for blocking a light beam when the shutter member is moved to the light beam blocked position and for not blocking the light beam when the shutter member is moved to the light beam passed position;

a shutter coil associated with the shutter member which generates an electromagnetic force when energized;

at least one magnet positioned proximate to the shutter coil and which generates a magnetic flux directed towards and intersecting the shutter coil;

electrically conductive means connecting the electrical current source member to the shutter member for passing electrical current from the electrical current source member to the shutter member to energize the shutter coil and to control movement of the shutter member between the light beam blocked position and the light beam passed position;

wherein when the shutter coil is energized, an electromagnetic force is generated by the shutter coil which interacts with the magnetic flux to thereby cause movement of the shutter member between the light beam blocked position and the light beam passed position; and a shutter state machine which electronically controls the movement of the shutter member between the light beam blocked position and the light beam passed position, wherein the light beam blocking member: (1) blocks the light beam when the shutter member is in the light beam blocked position; or (2) does not block the light beam when the shutter member is in the light beam passed position, wherein holographic data is read from a holographic storage medium when the shutter member is in the light beam passed position.

8. A system comprising an electromechanical shutter device comprising a base member and a shutter assembly associated with the base member, the shutter assembly comprising:

an electrical current source member associated with the base member;

a shutter member spaced apart from and movable with respect to the electrical current source member between a light beam blocked position and a light beam passed position;

a light beam blocking member associated with the shutter member for blocking a light beam when the shutter member is moved to the light beam blocked position and for not blocking the light beam when the shutter member is moved to the light beam passed position;

a shutter coil associated with the shutter member which generates an electromagnetic force when energized;

at least one magnet positioned proximate to the shutter coil and which generates a magnetic flux directed towards and intersecting the shutter coil;

electrically conductive means connecting the electrical current source member to the shutter member for passing electrical current from the electrical current source member to the shutter member to energize the shutter coil and to control movement of the shutter member between the light beam blocked position and the light beam passed position;

wherein when the shutter coil is energized, an electromagnetic force is generated by the shutter coil which interacts with the magnetic flux to thereby cause movement of the shutter member between the light beam blocked position and the light beam passed position; and a shutter state machine which electronically controls the movement of the shutter member between the light beam blocked position and the light beam passed position, wherein the light beam blocking member: (1) blocks the light beam when the shutter member is in the light beam blocked position; or (2) does not block the light beam when the shutter member is in the light beam passed position, wherein the shutter member is vertically movable upwardly towards the light beam blocked position and downwardly towards the light beam passed position.

9. The system of claim 8, wherein the shutter member has a generally triangular-shaped upper portion having an upper corner, and wherein the light beam blocking member comprises a generally rectangular-shaped shutter positioned proximate the upper corner.

10. The system of claim 8, wherein the electrically conductive means comprise a first pair of vertically spaced apart electrically conductive suspension wires and a second pair of vertically spaced apart electrically conductive suspension wires, the first and second pairs of suspension wires being positioned on opposite sides of the at least one magnet.

11. The system of claim 8, wherein the shutter coil comprises a lower section and an upper section, wherein the at least one magnet comprises a pair of magnet stacks positioned on opposite sides of the shutter member, and wherein the magnetic flux generated by the magnet stacks passes through the upper and lower sections of the shutter coil.

12. The system of claim 11, wherein electrical current passes through the shutter coil in one direction to energize the shutter coil to thereby cause the shutter member to move upwardly towards the light beam blocked position, and wherein the electrical current passes through the shutter coil in the opposite direction to energize the shutter coil to thereby cause the shutter member to move downwardly towards the light beam passed position.

13. A method comprising the following steps:
a. providing a light beam;
b. providing an electromechanical shutter device comprising a base member and a shutter assembly associated with the base member, the shutter assembly comprising:
an electrical current source member associated with the base member;
a shutter member spaced apart from and movable with respect to the electrical current source member between a light beam blocked position and a light beam passed position;
a light beam blocking member associated with the shutter member for blocking a light beam when the shutter member is moved to the light beam blocked position and for not blocking the light beam when the shutter member is moved to the light beam passed position;
a shutter coil associated with the shutter member which generates an electromagnetic force when energized;
at least one magnet positioned proximate to the shutter coil and which generates a magnetic flux directed towards and intersecting the shutter coil;
electrically conductive means connecting the electrical current source member to the shutter member for passing electrical current from the electrical current source member to the shutter member to energize the shutter coil and to control movement of the shutter member between the light beam blocked position and the light beam passed position;
wherein when the shutter coil is energized, an electromagnetic force is generated by the shutter coil which interacts with the magnetic flux to thereby cause movement of the shutter member between the light beam blocked position and the light beam passed position; and
c. electronically controlling movement of the shutter member between the light beam blocked position and the light beam passed position wherein the light beam blocking member: (1) blocks the light beam when the shutter member is in the light beam blocked position; or (2) does not block the light beam when the shutter member is in the light beam passed position,
wherein step (c) is carried out by initiating a sequence comprising one or more acceleration or deceleration pulses to cause the shutter member to move to block the light beam or pass the light beam.

14. The method of claim 13, wherein step (c) is carried out by initiating a sequence comprising, in order, an acceleration interval, a deceleration interval, and settling interval to cause the shutter member to move either a light beam blocked position or a light beam passed position.

15. A method comprising the following steps:
a. providing a light beam;
b. providing an electromechanical shutter device comprising a base member and a shutter assembly associated with the base member, the shutter assembly comprising:
an electrical current source member associated with the base member;
a shutter member spaced apart from and movable with respect to the electrical current source member between a light beam blocked position and a light beam passed position;
a light beam blocking member associated with the shutter member for blocking a light beam when the shutter member is moved to the light beam blocked position and for not blocking the light beam when the shutter member is moved to the light beam passed position;
a shutter coil associated with the shutter member which generates an electromagnetic force when energized;
at least one magnet positioned proximate to the shutter coil and which generates a magnetic flux directed towards and intersecting the shutter coil;
electrically conductive means connecting the electrical current source member to the shutter member for passing electrical current from the electrical current source member to the shutter member to energize the shutter coil and to control movement of the shutter member between the light beam blocked position and the light beam passed position;
wherein when the shutter coil is energized, an electromagnetic force is generated by the shutter coil which interacts with the magnetic flux to thereby cause movement of the shutter member between the light beam blocked position and the light beam passed position; and
c. electronically controlling movement of the shutter member between the light beam blocked position and the light beam passed position wherein the light beam blocking member: (1) blocks the light beam when the shutter member is in the light beam blocked position; or (2) does not block the light beam when the shutter member is in the light beam passed position,
wherein step (c) is carried out by initiating a sequence comprising one or more acceleration or deceleration pulses to cause the shutter member to move to block the light beam or pass the light beam,
wherein step (c) is carried out by initiating a sequence comprising, in order, an acceleration interval, a deceleration interval, and settling interval to cause the shutter member to move either a light beam blocked position or a light beam passed position,
wherein step (c) is carried out by initiating a sequence comprising, in order, an acceleration interval, a deceleration interval, and settling interval to cause the shutter member to move either towards a light beam blocked position or a light beam passed position.

16. A method comprising the following steps:
a. providing a light beam;
b. providing an electromechanical shutter device comprising a base member and a shutter assembly associated with the base member, the shutter assembly comprising:
an electrical current source member associated with the base member;
a shutter member spaced apart from and movable with respect to the electrical current source member between a light beam blocked position and a light beam passed position;
a light beam blocking member associated with the shutter member for blocking a light beam when the shutter member is moved to the light beam blocked position and for not blocking the light beam when the shutter member is moved to the light beam passed position;
a shutter coil associated with the shutter member which generates an electromagnetic force when energized;
at least one magnet positioned proximate to the shutter coil and which generates a magnetic flux directed towards and intersecting the shutter coil;
electrically conductive means connecting the electrical current source member to the shutter member for passing electrical current from the electrical current source member to the shutter member to energize the shutter coil and to control movement of the shutter member between the light beam blocked position and the light beam passed position;

wherein when the shutter coil is energized, an electromagnetic force is generated by the shutter coil which interacts with the magnetic flux to thereby cause movement of the shutter member between the light beam blocked position and the light beam passed position; and c. electronically controlling movement of the shutter member between the light beam blocked position and the light beam passed position wherein the light beam blocking member: (1) blocks the light beam when the shutter member is in the light beam blocked position; or (2) does not block the light beam when the shutter member is in the light beam passed position, wherein step (c) is carried out by initiating a sequence comprising one or more acceleration or deceleration pulses to cause the shutter member to move to block the light beam or pass the light beam, wherein step (c) is carried out by initiating a sequence comprising, in order, an acceleration interval, a deceleration interval, and settling interval to cause the shutter member to move either a light beam blocked position or a light beam passed position, wherein step (c) is carried out by initiating a sequence comprising, in order, an acceleration interval, a deceleration interval, and settling interval to cause the shutter member to move either towards a light beam blocked position or a light beam passed position, wherein the sequence of step (c) further comprises a holding the current interval after the settling interval.

17. A method comprising the following steps:
a. providing a light beam;
b. providing an electromechanical shutter device comprising a base member and a shutter assembly associated with the base member, the shutter assembly comprising:
an electrical current source member associated with the base member;
a shutter member spaced apart from and movable with respect to the electrical current source member between a light beam blocked position and a light beam passed position;
a light beam blocking member associated with the shutter member for blocking a light beam when the shutter member is moved to the light beam blocked position and for not blocking the light beam when the shutter member is moved to the light beam passed position;
a shutter coil associated with the shutter member which generates an electromagnetic force when energized;
at least one magnet positioned proximate to the shutter coil and which generates a magnetic flux directed towards and intersecting the shutter coil;
electrically conductive means connecting the electrical current source member to the shutter member for passing electrical current from the electrical current source member to the shutter member to energize the shutter coil and to control movement of the shutter member between the light beam blocked position and the light beam passed position;
wherein when the shutter coil is energized, an electromagnetic force is generated by the shutter coil which interacts with the magnetic flux to thereby cause movement of the shutter member between the light beam blocked position and the light beam passed position; and c. electronically controlling movement of the shutter member between the light beam blocked position and the light beam passed position wherein the light beam blocking member: (1) blocks the light beam when the shutter member is in the light beam blocked position; or (2) does not block the light beam when the shutter member is in the light beam passed position, wherein step (c) is carried out by initiating a sequence comprising one or more acceleration or deceleration pulses to cause the shutter member to move to block the light beam or pass the light beam, wherein step (c) is carried out by initiating a sequence comprising, in order, an acceleration interval, a deceleration interval, and settling interval to cause the shutter member to move either a light beam blocked position or a light beam passed position, wherein the sequence of step (c) further comprises a non-active state between adjacent acceleration and deceleration intervals.

18. A method comprising the following steps:
a. providing a light beam;
b. providing an electromechanical shutter device comprising a base member and a shutter assembly associated with the base member, the shutter assembly comprising:
an electrical current source member associated with the base member;
a shutter member spaced apart from and movable with respect to the electrical current source member between a light beam blocked position and a light beam passed position;
a light beam blocking member associated with the shutter member for blocking a light beam when the shutter member is moved to the light beam blocked position and for not blocking the light beam when the shutter member is moved to the light beam passed position;
a shutter coil associated with the shutter member which generates an electromagnetic force when energized;
at least one magnet positioned proximate to the shutter coil and which generates a magnetic flux directed towards and intersecting the shutter coil;
electrically conductive means connecting the electrical current source member to the shutter member for passing electrical current from the electrical current source member to the shutter member to energize the shutter coil and to control movement of the shutter member between the light beam blocked position and the light beam passed position;
wherein when the shutter coil is energized, an electromagnetic force is generated by the shutter coil which interacts with the magnetic flux to thereby cause movement of the shutter member between the light beam blocked position and the light beam passed position;

c. electronically controlling movement of the shutter member between the light beam blocked position and the light beam passed position wherein the light beam blocking member: (1) blocks the light beam when the shutter member is in the light beam blocked position; or (2) does not block the light beam when the shutter member is in the light beam passed position, and d. recording holographic data in a holographic storage medium when the shutter member is in the light beam passed position.

19. A method comprising the following steps:
a. providing a light beam;
b. providing an electromechanical shutter device comprising a base member and a shutter assembly associated with the base member, the shutter assembly comprising:
an electrical current source member associated with the base member;

a shutter member spaced apart from and movable with respect to the electrical current source member between a light beam blocked position and a light beam passed position;

a light beam blocking member associated with the shutter member for blocking a light beam when the shutter member is moved to the light beam blocked position and for not blocking the light beam when the shutter member is moved to the light beam passed position;

a shutter coil associated with the shutter member which generates an electromagnetic force when energized;

at least one magnet positioned proximate to the shutter coil and which generates a magnetic flux directed towards and intersecting the shutter coil;

electrically conductive means connecting the electrical current source member to the shutter member for passing electrical current from the electrical current source member to the shutter member to energize the shutter coil and to control movement of the shutter member between the light beam blocked position and the light beam passed position;

wherein when the shutter coil is energized, an electromagnetic force is generated by the shutter coil which interacts with the magnetic flux to thereby cause movement of the shutter member between the light beam blocked position and the light beam passed position;

c. electronically controlling movement of the shutter member between the light beam blocked position and the light beam passed position wherein the light beam blocking member: (1) blocks the light beam when the shutter member is in the light beam blocked position; or (2) does not block the light beam when the shutter member is in the light beam passed position, and d. reading holographic data from a holographic storage medium when the shutter member is in the light beam passed position.

20. A method comprising the following steps:

a. providing a light beam;

b. providing an electromechanical shutter device comprising a base member and a shutter assembly associated with the base member, the shutter assembly comprising:

an electrical current source member associated with the base member;

a shutter member spaced apart from and movable with respect to the electrical current source member between a light beam blocked position and a light beam passed position;

a light beam blocking member associated with the shutter member for blocking a light beam when the shutter member is moved to the light beam blocked position and for not blocking the light beam when the shutter member is moved to the light beam passed position;

a shutter coil associated with the shutter member which generates an electromagnetic force when energized;

at least one magnet positioned proximate to the shutter coil and which generates a magnetic flux directed towards and intersecting the shutter coil;

electrically conductive means connecting the electrical current source member to the shutter member for passing electrical current from the electrical current source member to the shutter member to energize the shutter coil and to control movement of the shutter member between the light beam blocked position and the light beam passed position;

wherein when the shutter coil is energized, an electromagnetic force is generated by the shutter coil which interacts with the magnetic flux to thereby cause movement of the shutter member between the light beam blocked position and the light beam passed position; and c. electronically controlling movement of the shutter member between the light beam blocked position and the light beam passed position wherein the light beam blocking member: (1) blocks the light beam when the shutter member is in the light beam blocked position; or (2) does not block the light beam when the shutter member is in the light beam passed position, wherein step (c) is carried out by vertically moving the shutter member upwardly towards the light beam blocked position or downwardly towards the light beam passed position.

21. A method comprising the following steps:

a. providing a light beam;

b. providing an electromechanical shutter device comprising a base member and a shutter assembly associated with the base member, the shutter assembly comprising:

an electrical current source member associated with the base member;

a shutter member spaced apart from and movable with respect to the electrical current source member between a light beam blocked position and a light beam passed position;

a light beam blocking member associated with the shutter member for blocking a light beam when the shutter member is moved to the light beam blocked position and for not blocking the light beam when the shutter member is moved to the light beam passed position;

a shutter coil associated with the shutter member which generates an electromagnetic force when energized;

at least one magnet positioned proximate to the shutter coil and which generates a magnetic flux directed towards and intersecting the shutter coil;

electrically conductive means connecting the electrical current source member to the shutter member for passing electrical current from the electrical current source member to the shutter member to energize the shutter coil and to control movement of the shutter member between the light beam blocked position and the light beam passed position;

wherein when the shutter coil is energized, an electromagnetic force is generated by the shutter coil which interacts with the magnetic flux to thereby cause movement of the shutter member between the light beam blocked position and the light beam passed position; and c. electronically controlling movement of the shutter member between the light beam blocked position and the light beam passed position wherein the light beam blocking member: (1) blocks the light beam when the shutter member is in the light beam blocked position; or (2) does not block the light beam when the shutter member is in the light beam passed position, wherein step (c) is carried out by vertically moving the shutter member upwardly towards the light beam blocked position or downwardly towards the light beam passed position, wherein step (c) is carried out by passing electrical current through the shutter coil in one direction to energize the shutter coil to thereby cause the shutter member to move upwardly towards the light beam blocked position, or by passing the electrical current through the shutter coil in the opposite direction to energize the shutter coil to thereby cause the shutter member to move downwardly towards the light beam passed position.

22. A method comprising the following steps:
a. providing a light beam;
b. providing an electromechanical shutter device comprising a base member and a shutter assembly associated with the base member, the shutter assembly comprising:
an electrical current source member associated with the base member;
a shutter member spaced apart from and movable with respect to the electrical current source member between a light beam blocked position and a light beam passed position;
a light beam blocking member associated with the shutter member for blocking a light beam when the shutter member is moved to the light beam blocked position and for not blocking the light beam when the shutter member is moved to the light beam passed position;
a shutter coil associated with the shutter member which generates an electromagnetic force when energized;
at least one magnet positioned proximate to the shutter coil and which generates a magnetic flux directed towards and intersecting the shutter coil;
electrically conductive means connecting the electrical current source member to the shutter member for passing electrical current from the electrical current source member to the shutter member to energize the shutter coil and to control movement of the shutter member between the light beam blocked position and the light beam passed position;
wherein when the shutter coil is energized, an electromagnetic force is generated by the shutter coil which interacts with the magnetic flux to thereby cause movement of the shutter member between the light beam blocked position and the light beam passed position;
c. electronically controlling movement of the shutter member between the light beam blocked position and the light beam passed position wherein the light beam blocking member: (1) blocks the light beam when the shutter member is in the light beam blocked position; or (2) does not block the light beam when the shutter member is in the light beam passed position,
wherein step (c) is carried out by initiating a sequence comprising one or more acceleration or deceleration pulses to cause the shutter member to move to block the light beam or pass the light beam,
wherein step (c) is carried out by initiating a sequence comprising, in order, an acceleration interval, a deceleration interval, and settling interval to cause the shutter member to move either a light beam blocked position or a light beam passed position,
wherein step (c) is carried out by initiating a sequence comprising, in order, an acceleration interval, a deceleration interval, and settling interval to cause the shutter member to move either towards a light beam blocked position or a light beam passed position,
wherein the sequence of step (c) further comprises a holding the current interval after the settling interval; and
d. tuning of one or more of the intervals, currents, and pulse amplitudes of one or more of the acceleration, deceleration, settling and holding the current intervals to minimize ringing.

23. A method comprising the following steps:
a. providing a light beam;
b. providing an electromechanical shutter device comprising a base member and a shutter assembly associated with the base member, the shutter assembly comprising:
an electrical current source member associated with the base member;
a shutter member spaced apart from and movable with respect to the electrical current source member between a light beam blocked position and a light beam passed position;
a light beam blocking member associated with the shutter member for blocking a light beam when the shutter member is moved to the light beam blocked position and for not blocking the light beam when the shutter member is moved to the light beam passed position;
a shutter coil associated with the shutter member which generates an electromagnetic force when energized;
at least one magnet positioned proximate to the shutter coil and which generates a magnetic flux directed towards and intersecting the shutter coil;
electrically conductive means connecting the electrical current source member to the shutter member for passing electrical current from the electrical current source member to the shutter member to energize the shutter coil and to control movement of the shutter member between the light beam blocked position and the light beam passed position;
wherein when the shutter coil is energized, an electromagnetic force is generated by the shutter coil which interacts with the magnetic flux to thereby cause movement of the shutter member between the light beam blocked position and the light beam passed position;
c. electronically controlling movement of the shutter member between the light beam blocked position and the light beam passed position wherein the light beam blocking member: (1) blocks the light beam when the shutter member is in the light beam blocked position; or (2) does not block the light beam when the shutter member is in the light beam passed position,
wherein step (c) is carried out by initiating a sequence comprising one or more acceleration or deceleration pulses to cause the shutter member to move to block the light beam or pass the light beam,
wherein step (c) is carried out by initiating a sequence comprising, in order, an acceleration interval, a deceleration interval, and settling interval to cause the shutter member to move either a light beam blocked position or a light beam passed position,
wherein the sequence of step (c) further comprises a non-active state between adjacent acceleration and deceleration intervals; and
d. tuning of one or more of the intervals, currents, and pulse amplitudes of one or more of the acceleration, deceleration, settling and holding the current intervals to minimize ringing.

24. A method comprising the following steps:
a. providing a light beam;
b. providing an electromechanical shutter device comprising a base member and a shutter assembly associated with the base member, the shutter assembly comprising:
an electrical current source member associated with the base member;

a shutter member spaced apart from and movable with respect to the electrical current source member between a light beam blocked position and a light beam passed position;

a light beam blocking member associated with the shutter member for blocking a light beam when the shutter member is moved to the light beam blocked position and for not blocking the light beam when the shutter member is moved to the light beam passed position;

a shutter coil associated with the shutter member which generates an electromagnetic force when energized;

at least one magnet positioned proximate to the shutter coil and which generates a magnetic flux directed towards and intersecting the shutter coil;

electrically conductive means connecting the electrical current source member to the shutter member for passing electrical current from the electrical current source member to the shutter member to energize the shutter coil and to control movement of the shutter member between the light beam blocked position and the light beam passed position;

wherein when the shutter coil is energized, an electromagnetic force is generated by the shutter coil which interacts with the magnetic flux to thereby cause movement of the shutter member between the light beam blocked position and the light beam passed position;

c. electronically controlling movement of the shutter member between the light beam blocked position and the light beam passed position wherein the light beam blocking member: (1) blocks the light beam when the shutter member is in the light beam blocked position; or (2) does not block the light beam when the shutter member is in the light beam passed position, wherein step (c) is carried out by passing electrical current through the shutter coil in one direction to energize the shutter coil to thereby cause the shutter member to move upwardly towards the light beam blocked position, or by passing the electrical current through the shutter coil in the opposite direction to energize the shutter coil to thereby cause the shutter member to move downwardly towards the light beam passed position; and d. recording holographic data in a holographic storage medium when the shutter member is in the light beam passed position.

25. A method comprising the following steps:

a. providing a light beam;

b. providing an electromechanical shutter device comprising a base member and a shutter assembly associated with the base member, the shutter assembly comprising:

an electrical current source member associated with the base member;

a shutter member spaced apart from and movable with respect to the electrical current source member between a light beam blocked position and a light beam passed position;

a light beam blocking member associated with the shutter member for blocking a light beam when the shutter member is moved to the light beam blocked position and for not blocking the light beam when the shutter member is moved to the light beam passed position;

a shutter coil associated with the shutter member which generates an electromagnetic force when energized;

at least one magnet positioned proximate to the shutter coil and which generates a magnetic flux directed towards and intersecting the shutter coil;

electrically conductive means connecting the electrical current source member to the shutter member for passing electrical current from the electrical current source member to the shutter member to energize the shutter coil and to control movement of the shutter member between the light beam blocked position and the light beam passed position;

wherein when the shutter coil is energized, an electromagnetic force is generated by the shutter coil which interacts with the magnetic flux to thereby cause movement of the shutter member between the light beam blocked position and the light beam passed position;

c. electronically controlling movement of the shutter member between the light beam blocked position and the light beam passed position wherein the light beam blocking member: (1) blocks the light beam when the shutter member is in the light beam blocked position; or (2) does not block the light beam when the shutter member is in the light beam passed position, wherein step (c) is carried out by passing electrical current through the shutter coil in one direction to energize the shutter coil to thereby cause the shutter member to move upwardly towards the light beam blocked position, or by passing the electrical current through the shutter coil in the opposite direction to energize the shutter coil to thereby cause the shutter member to move downwardly towards the light beam passed position; and d. reading holographic data from a holographic storage medium when the shutter member is in the light beam passed position.

26. A method comprising the following steps:

a. providing a light beam;

b. providing an electromechanical shutter device comprising a base member and a shutter assembly associated with the base member, the shutter assembly comprising:

an electrical current source member associated with the base member;

a shutter member spaced apart from and movable with respect to the electrical current source member between a light beam blocked position and a light beam passed position;

a light beam blocking member associated with the shutter member for blocking a light beam when the shutter member is moved to the light beam blocked position and for not blocking the light beam when the shutter member is moved to the light beam passed position;

a shutter coil associated with the shutter member which generates an electromagnetic force when energized;

at least one magnet positioned proximate to the shutter coil and which generates a magnetic flux directed towards and intersecting the shutter coil;

electrically conductive means connecting the electrical current source member to the shutter member for passing electrical current from the electrical current source member to the shutter member to energize the shutter coil and to control movement of the shutter member between the light beam blocked position and the light beam passed position;

wherein when the shutter coil is energized, an electromagnetic force is generated by the shutter coil which interacts with the magnetic flux to thereby cause movement of the shutter member between the light beam blocked position and the light beam passed position; and c. electronically controlling movement of the shutter member between the light beam blocked position and the light beam passed position wherein the light beam blocking member: (1) blocks the light beam when the shutter member is in the light beam blocked position; or (2) does not block the light beam when the shutter member is in the light beam passed position, wherein step (c) is carried out by vertically moving the shutter member upwardly towards the light beam blocked position or downwardly towards the light beam passed position, wherein step (c) is carried out by passing electrical current through the shutter coil in one direction to energize the shutter coil to thereby cause the shutter member to move upwardly towards the light beam blocked position, or by passing the electrical current through the shutter coil in the opposite direction to energize the shutter coil to thereby cause the shutter member to move downwardly towards the light beam passed position.

* * * * *